AIRCRAFT RADIO APPARATUS

Filed Oct. 15, 1945 8 Sheets-Sheet 1

INVENTOR.
WILLIAM K. ERGEN.

BY

George H. Fisher
ATTORNEY

Oct. 6, 1953 W. K. ERGEN 2,654,882

AIRCRAFT RADIO APPARATUS

Filed Oct. 15, 1945 8 Sheets-Sheet 2

INVENTOR.
WILLIAM K. ERGEN

BY George H. Fisher
ATTORNEY

BY

INVENTOR.
WILLIAM K. ERGEN

George H. Fisher
ATTORNEY

INVENTOR.
WILLIAM K. ERGEN
BY
George H. Fisher
ATTORNEY

Oct. 6, 1953 W. K. ERGEN 2,654,882

AIRCRAFT RADIO APPARATUS

Filed Oct. 15, 1945 8 Sheets-Sheet 5

INVENTOR.
WILLIAM K. ERGEN

BY George H. Fisher
ATTORNEY

Oct. 6, 1953 W. K. ERGEN 2,654,882

AIRCRAFT RADIO APPARATUS

Filed Oct. 15, 1945 8 Sheets-Sheet 6

INVENTOR
WILLIAM K. ERGEN

BY George N. Fisher
ATTORNEY

Oct. 6, 1953 W. K. ERGEN 2,654,882

AIRCRAFT RADIO APPARATUS

Filed Oct. 15, 1945 8 Sheets-Sheet 7

INVENTOR.
WILLIAM K. ERGEN.

BY

George H. Fisher
ATTORNEY

Oct. 6, 1953 W. K. ERGEN 2,654,882

AIRCRAFT RADIO APPARATUS

Filed Oct. 15, 1945 8 Sheets-Sheet 8

INVENTOR.
WILLIAM K. ERGEN

BY

George H. Fisher
ATTORNEY

Patented Oct. 6, 1953 2,654,882

UNITED STATES PATENT OFFICE 2,654,882

AIRCRAFT RADIO APPARATUS

William K. Ergen, Indianapolis, Ind., assignor to Minneapolis-Honeywell Regulator Company, Minneapolis, Minn., a corporation of Delaware Application October 15, 1945, Serial No. 622,461

22 Claims. (Cl. 343—7)

This invention relates to the field of instruments which provide control or supervision of the operation of a cargo releasing aircraft so that its ground path and the point at which release of the cargo takes place may be coordinated with suitable radio signals.

It is an object of the invention to provide means for directing the craft along a rectilinear course from any instantaneous location of the craft to a selected destination, by the use of radio relaying base stations having known geographic locations with respect to the destination and cooperating with radio transmitting and receiving means carried by the craft.

It is another object of the invention to provide means indicating the interval remaining before the arrival of a craft at its true destination, or at a virtual destination having a predetermined relationship with the true destination, by the use of the radio equipment above recited.

It is another object of the invention to provide means directing the course of a craft towards a selected destination and automatically performing a mechanical function, such as releasing or picking up cargo, upon arriving at the destination, by the use of the radio equipment above recited.

It is another object of the invention to provide means directing a craft along a rectilinear course passing through a selected destination, characterized by the fact that the magnitudes of the components of the velocity of the craft along lines joining a pair of base stations with the selected destination, are proportional to the magnitudes of the projections, on the same lines, of the distance between the craft and its destination.

A more specific object of the invention is to provide a normally energized electric bridge having resistances manually variable in accordance with the magnitudes of the above components of the velocity of the craft, and other resistances variable by motor means in accordance with the magnitudes of the above projections, together with means directing the course of the craft in accordance with the unbalance of the bridge.

Another specific object of the invention is to provide a plurality of resistors and means for connecting the resistors in one or the other of two bridges having the same energizing source and the same immediate output circuit, and for selecting one of a plurality of ultimate controlled devices for energization in accordance with unbalance of the bridge.

A further specific object of the invention is to provide a plurality of motor control circuits and a plurality of variable resistors adapted for association in two distinct electric bridges having the same energizing source and load circuit, together with means for varying the resistances of certain resistors in the bridge system simultaneously with operation of the motor control circuits, and with means for varying other resistors in the bridge system by motors controlled by the motor control circuits, means being also provided for varying further resistances in the bridge system in accordance with components, in selected directions, of a vector quantity also having a selected direction, and for varying a still further resistor in the bridge system in accordance with the unbalance of one of the bridges.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which there is illustrated and described a preferred embodiment of my invention.

In the drawing:

Figures 1, 2, and 3 are diagrams illustrative of the basis of operation for the invention;

Figures 4, 5, 6, and 7 are mechanical schematics illustrative of the structure of the invention;

*General description*

Figure 10:
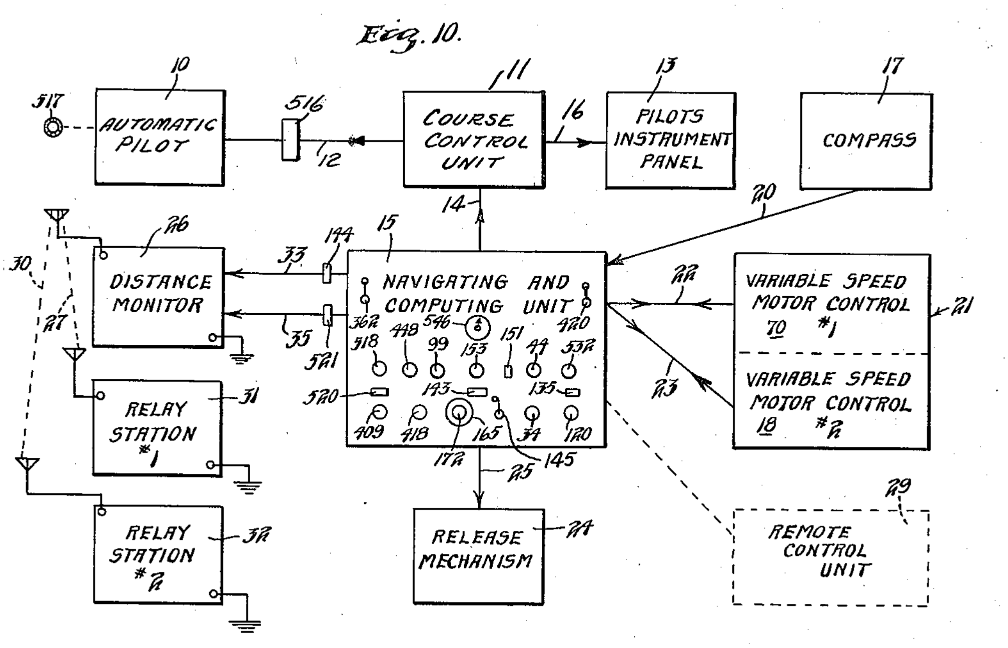
Figure 10 is a block diagram showing the interrelation between portions of a complete system comprising the invention.

A complete system for controlling the operation of a cargo releasing aircraft according to the invention is schematically illustrated in Figure 10, to which reference should now be made. In the figure, 10 is the automatic pilot of an aircraft, and may be electric, hydraulic, or of any other desired nature. A course control unit 11 is provided for actuating the azimuth function of the automatic pilot by means appropriate to the structure thereof and is shown as coupled thereto by the means 12 which includes a disengaging member 516. A pilot's instrument panel is shown at 13, and is coupled by means 16 to course control unit 11, which is in turn coupled by means 14 to a navigating and computing unit 15 whose manual controls and indicators are schematically indicated. Disengaging member 516 is provided so that the panel may be actuated independently of the course control unit.

The craft is to be equipped with a compass as shown at 17, which is coupled by suitable telemetric means 20 to unit 15 for effecting the operation thereof. In order to control the speed of motors comprised in unit 15, presently to be described, by operation of control members also comprised in the unit, a pair of variable speed motor controls 18 and 70 are shown at 21: they are individually coupled as at 22 and 23 to unit 15. A mechanism 24 which may be designed to pick up or release cargo or to perform any other desired function is also shown as coupled, by means 25, to unit 15 for actuation thereby.

A distance monitor 26 is shown as associated by radio means 27 and 30 with a pair of base relay stations 31 and 32, and a pair of mechanical inputs 33 and 35 are shown actuating monitor 26 under the control of unit 15, through disengaging members 144 and 521. A remote control unit 29 may also be incorporated in the system if desired. The constructional details and arrangements of components 11, 13, 15, and 21 comprise the structural contributions of this invention, but the invention also embraces the combination of these novel members with the remaining components in the complete system and in subordinate combinations thereof.

*The navigating function*

One function of the complete system is to control the automatic pilot of a craft, according to indications of the distance monitor, so that the craft follows a straight line course from its position at any time to a selected destination. It will be appreciated that this function can be performed equally well for an aircraft or a marine craft, and to a limited extent for land craft constructed for cross country travel. The disclosure in an aircraft is of course only illustrative.

While the components enumerated above were designed to cooperate with a particular radio instrument, the invention is not so limited, and is adaptable for use with almost any distance monitoring device, whether radio or mechanical. Details of the structure and theoretical operation of any such monitoring devices comprise no part of the invention, and are therefore not specifically illustrated.

As a basis for a complete understanding of the invention, however, the operation of a generalized radio instrument serviceable as unit 26 will now be described. It must be borne in mind that this disclosure is made only for illustration, and that many monitoring devices with which the invention is well adapted to cooperate will occur to those skilled in the art. For confirmation and additional information relative to the radio principles here disclosed, reference is made to the April and May issues of "Q. S. T." for the year 1945.

The purpose of monitor 26 is to give a continuous indication of the distance between the craft in which it is mounted and each of the two fixed relay stations, 31 and 32. This is accomplished in each case by observing the interval between the transmission of an electromagnetic impulse and the reception of the impulse after retransmission from each relay station: since the speed of propagation of electromagnetic radiation is known, and the relay interval required at the relay station to receive and retransmit the radiation may be accurately determined, the interval observed is a measure of the distance between the station and the craft. The system operates on well known principles briefly reviewed in the next three paragraphs.

The speed of propagation of electromagnetic radiations has been determined with great accuracy to be 186,284 miles per second: that is, a radiation requires about $5\frac{1}{3}$ microseconds to travel a mile. A measurement of the interval between the transmission of a pulse of electromagnetic radiation at one point and its reception at another would consequently be a measurement of the distance between the receiver and the transmitter, but involves the impossibility of determining at either station, without time lag, exactly when the function at the other end is performed. This difficulty can be avoided by measuring the time required for the radiation to travel from the transmitter over the required distance and to return, and dividing this time by two, if there is no loss of time at the point whose distance is to be measured. A reflected radiation, such as is used in absolute altimeters, is an example of this system.

It is not usually easy to determine, among all of the reflections of the radiated pulse, which one comes from the point in question. If a radio relay station is established at that point, however, to retransmit the pulse, the retransmitted pulse can be identified by its greater amplitude, and the interval between transmission of the original pulse and reception of the retransmitted pulse, reduced by the relay interval, is a measurement of the round trip distance desired. This procedure is simplified when the relay interval is constant, since it can then be taken into consideration in the original setting up of the instrument, the indication thereafter being proportional to the desired distance.

In a conventional cathode ray oscilloscope tube, it is possible to cause the beam to trace a circle on the screen by applying alternating voltages of the same frequency to the pairs of deflecting plates in phase quadrature: the beam travels around the circle once for each cycle of the alternating or sweep voltage. If the sweep frequency is 93,142 cycles per second, the beam traces its cycle once while a signal pulse of electromagnetic radiation is traveling one round trip mile. Reducing the sweep frequency decimally has the effect of decimally increasing the distance traveled by the radiated pulse in one period of the sweep voltage. If, in addition to the sweep frequency, a voltage pulse is impressed on a suitable electrode by transmission of the signal pulse, and a second voltage pulse is impressed on this electrode by the reception of the retransmitted pulse, the angular displacement about the circle between the traces of the two voltage pulses is a measure of the travel time of the radiation, and therefore of the round trip distance to be determined. The transmitted pulse may be repeated each time the sweep voltage passes through a particular point in its cycle, so that the indication on the screen of the tube appears continuous.

The system requires a pulse transmitter, a pulse receiver, and the indicating oscilloscope in the moving craft, and a fixed relay station on the ground for each distance to be measured. The units combining to give the distance from an arbitrarily assigned first station S1 will be referred to as primary and the other as secondary. Operation of the system depends on observation of the angle between the transmitted and received pulses as described above. If a phase shifter is provided in the receiver it is possible, by operation of the phase shifter, to bring the trace of the received pulse into alignment with that of the transmitted pulse. When this condition is reached the amount of angular displacement of the phase shifter shaft, from its position when the distance between the transmitter and the base station is zero, is a measurement of the round trip distance required, if considered in conjunction with quotient of 93,142 divided by the sweep frequency. Likewise, if a phase shifter shaft is operated at such a rate as to hold the relative positions of the two pulses on an oscilloscope screen constant, the speed of operation of the shaft is proportional to the speed of the craft with respect to the base station.

*The navigation problem*

Figures 1, 2:
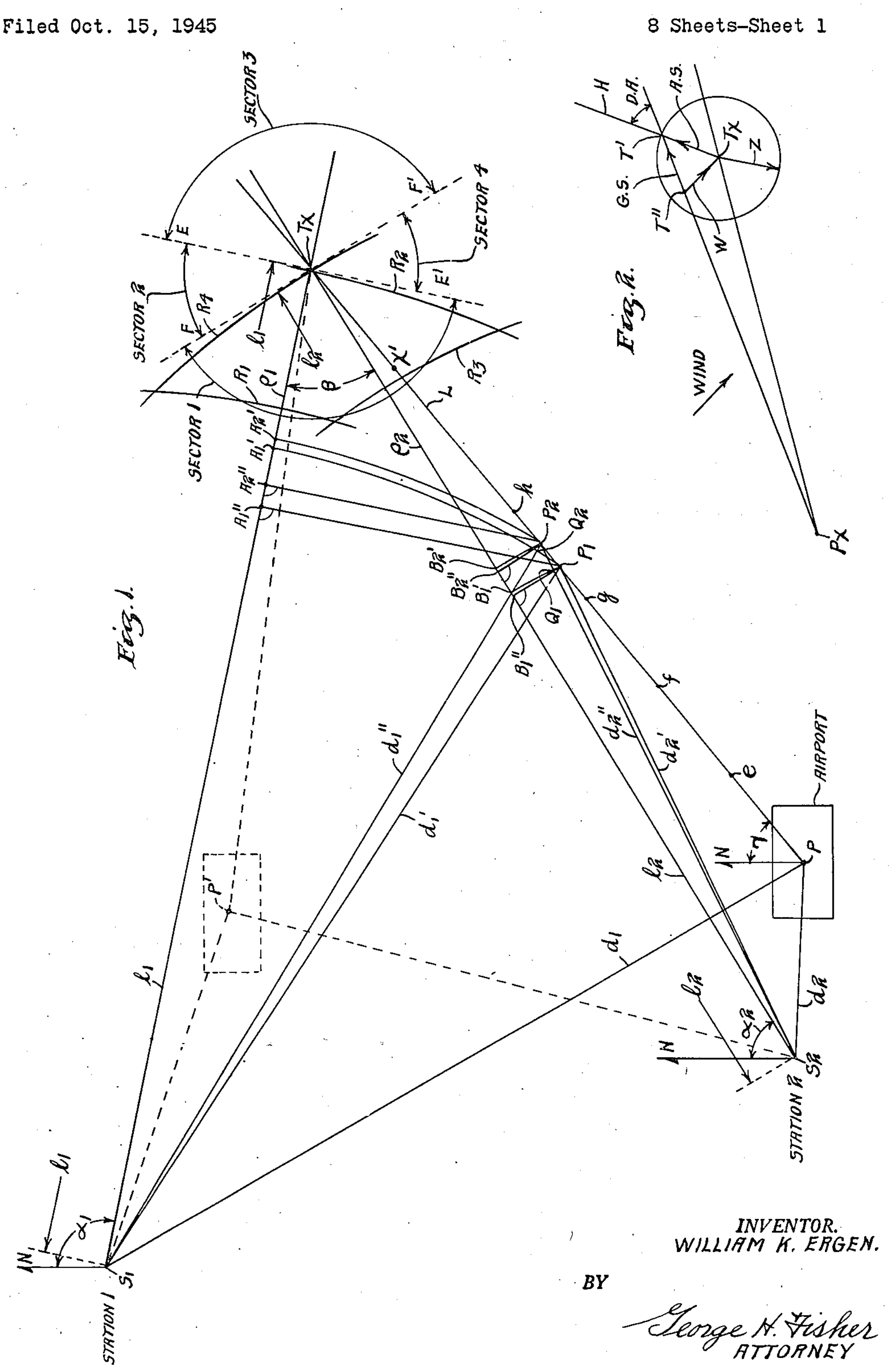
Figures 3, 4:
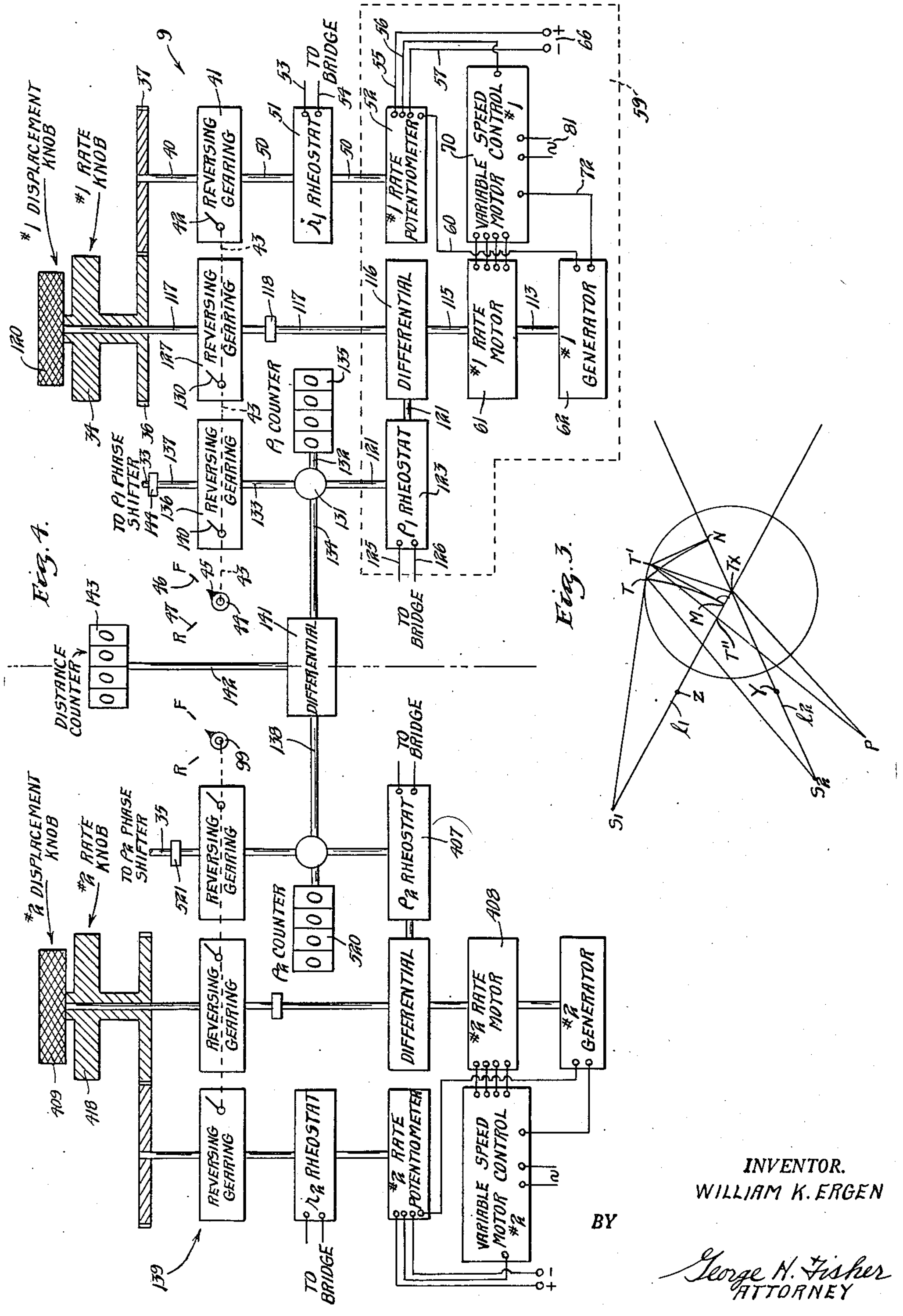

Before commencing a detailed description of structures embodying the invention, reference is made to Figures 1, 2, and 3, which present the problem of mensuration which it is desired to solve and show the method by which the solution is accomplished. In Figure 1, a craft carrying the distance monitor is located at $P_1$, a first relay station is located at $S_1$ and a second relay station is located at $S_2$. Here $d_1'$ is the distance from the craft to station $S_1$, as indicated by the primary phase shifter in the distance monitor—henceforth called the primary radio distance. Similarly, $d_2'$ is the secondary radio distance; that between the craft and the second relay station: the words primary and secondary are to be interpreted in terms of mutual distinction rather than in terms of significance or importance.

Now suppose the craft moves to a new position $P_2$: there the primary radio distance is $d_1''$ and the secondary radio distance is $d_2''$. A change $P_2Q_2$ in the primary radio distance and a change $P_2Q_1$ in the secondary radio distance accompany the change $P_1P_2$ in the location of the monitor, the points $Q_2$ and $Q_1$ lying on arcs having centers $S_1$ and $S_2$ and radii $d_1'$ and $d_2'$, which arcs cut lines $l_1$ and $l_2$ at $A_1'$ and $B_1'$, all respectively.

Suppose the craft is moving towards a destination Tx, so located that the line $S_1$Tx has a magnetic azimuth $\alpha_1$ and a length $l_1$, both of which can be determined from a map of the area to be traversed. Similarly, the magnetic azimuth $\alpha_2$ and the length $l_2$ of the line $S_2$Tx can also be determined. Arcs having radii $S_1P_2$ and $S_2P_2$ may now be swung from $S_1$ and $S_2$, respectively as centers, intersecting $l_1$ and $l_2$ at $A_2'$ and $B_2'$, respectively. $S_1A_1'$ is equal in length to $S_1P_1$; $S_1A_2'$ to $S_1P_2$; $S_2B_1'$ to $S_2P_1$; and $S_2B_2'$ to $S_2P_2$.

For any general position P of the craft, displaced from Tx by a distance $L(=PTx)$, let $\rho_1$ be defined as $l_1-d_1$, and $\rho_2$ as $l_2-d_2$. For point $P_1$ then, $\rho_1=A_1'Tx$, and $\rho_2'=B_1'Tx$.

Suppose the craft to be moving toward Tx at a velocity $\dot{r}$; then on a suitable scale the line $P_1P_2$ represents the vector $\dot{r}$, and its components $\dot{r}_1$ and $\dot{r}_2$ along lines $S_1$Tx and $S_2$Tx are represented by $A_1''A_2''$ and $B_1''B_2''$, respectively: for a constant ratio of $\dot{r}$ the values of $\dot{r}_1$ and $\dot{r}_2$ are constant.

Let $t$ be the time required for the craft to travel the distance L at the rate $\dot{r}$; that is, $$\dot{r}=L/t$$

Then $$\dot{r}_1=(L/t)\cos\overline{S_1TxP_1}$$

and $$\dot{r}_2=(L/t)\cos\overline{S_2TxP_1}$$

But $$A_1''Tx=L\cos\overline{S_1TxP_1}$$

and $$B_1''Tx=L\cos\overline{S_2TxP_1}$$

$A_1''$Tx and $B_1''$Tx are in turn equal to $\rho_1+A_1''A_1'$ and $\rho_2+B_1''B_1'$, respectively.

One of the assumptions on which operation of the invention is based is that $A_1''A_1'$ and $B_1''B_1'$ are both equal to zero. It has been found by trial that this assumption can be made without serious error, especially where L is small compared with $d_1$ and $d_2$; that is, the instrument becomes more accurate, as far as this factor is concerned, as the destination is approached. On the basis of this assumption $$\dot{r}_1=\rho_1/t$$

and $$\dot{r}_2=\rho_2/t$$

from which may be derived the basic equation $$\dot{r}_1/\dot{r}_2=\rho_1\rho_2 \qquad (1)$$

This is a condition for movement of the craft along a straight line from its location $P_1$ to the destination Tx, and it may be shown that for no other course from $P_1$ does this equation hold.

It should of course be realized that the foregoing analysis is true for any point P taken anywhere around Tx and refers to rectilinear motion of the craft at a constant speed from the particular point P to Tx. The point P may be either within or without the angle $\beta(=\overline{S_1TxS_2})$ and may even be on the other side of Tx from stations $S_1$ and $S_2$. Since $\rho_1=l_1-d_1$ it has negative values for points A or B on the other side of Tx from $S_1$ and $\rho_2$ has negative values for points A or B on the other side of Tx from $S_2$. The space about Tx may be divided into four unequal sectors, as indicated in the figure by lines EE' and FF'. In sector 1, both $\rho_1$ and $\rho_2$ are positive, and in sector 3 both $\rho_1$ and $\rho_2$ are negative. These sectors are equal. In sector 2, $\rho_1$ is positive and $\rho_2$ is negative, while in sector 4 $\rho_2$ is positive and $\rho_1$ is negative: these sectors also are equal. An instrument for making use of the principle here enunciated in its broadest fashion must therefore be provided with reversing means to be resorted to as the craft travel toward the destination through different sectors.

In the foregoing discussion, it was assumed that the medium through which the movement of the craft takes place is motionless with respect to Tx, as exemplified by the flight of aircraft in still air. The principle also applies regardless of the direction and magnitude of the wind if it is simply desired to cause the aircraft to pass over the destination Tx, since the distances and rates are measured with respect to the ground. However, if it is desired, for example, to pick up a unit of cargo at the end of a wire let down from the plane, or to release cargo-carrying units from a high altitude so that their trajectories will carry them into suitable shock absorbing receivers, it becomes necessary for the craft to pass, not directly over the true destination, but in a particular direction through a particular point, the virtual destination, whose location with respect to the true destination can be determined. Thus it will be appreciated that for any particular configuration of cargo carrier, such for example as a streamlined cylinder dropped from an aircraft in uniform rectilinear flight, there is a displacement, even in still air, between the point on the earth's surface at which the carrier descends and the point on the earth's surface directly under the aircraft at the instant of impact. The magnitude and direction of this displacement, which will be referred to as the trail distance $T_R$ of the carrier, are affected by the altitude from which the carrier is released, the speed of the aircraft, and the magnitude and direction of the wind.

It is now well known that the point of impact of any object dropped from an aircraft in uniform rectilinear flight lies in the vertical plane containing the longitudinal axis of the airplane at the instant of impact, regardless of the direction and velocity of the wind through which the aircraft is flying. It is also known that for any particular configuration of falling object, the distance between the point of impact and the point under the aircraft at the moment of impact, and the time required for the object to complete its fall, are determined by the air speed and altitude of the craft releasing the object and may be presented in tabular form. The trail distance and the time of fall of such a body are included among what are referred to as its ballistic characteristic.

The problem is illustrated in Figure 2, in which an aircraft is assumed to be located at $P_X$ and it is desired that a cargo carrier be dropped on the point $T_X$: there is to be found a rectilinear course from $P_X$ passing through a point T′ such that for a particular altitude and air speed of the aircraft, the trail distance $T_R$ of the carrier terminates on point $T_X$. This may be accomplished in the following fashion.

The magnitude and direction of the wind may be determined either by radio information from a ground station or independently by the observation of the drift angles when the craft follows a pair of courses whose bearings make a ninety degree angle, as is well known. About the point $T_X$ on a map strike off a circle having a radius equal to the trail distance $T_R$ of the body for the proposed altitude and air speed, on the same scale that $P_XT_X$ represents the distance of the aircraft from the point $T_X$. Now take a new scale such that the radius of the circle is equal in magnitude to the proposed air speed to be maintained, and at this scale mark off backwards from point $T_X$ the wind vector $T''T_X$: a line from $P_X$ passing through T″ intersects the circle at such a point T′ that $\overline{T''T'T_X}$ is the familiar wind triangle. The magnitude of $T_R$ is usually very small compared with the magnitude of $\overline{P_XT_X}$, and the plotting of such a course as described above involves inaccuracies in reading the angle $\overline{T''P_XT_X}$, which is very small. The present invention however embodies means referred to as a trail resolver for performing this function mechanically.

It is now apparent that the navigation problem as regards station $S_1$ and $S_2$ is not directing the aircraft to pass over $T_X$ but directing it to pass over T′ in the direction $P_XT'$. This is accomplished as is shown in Figure 3, in which the points $S_1$, $S_2$, P, T″, T′, and $T_X$ have the same meanings as already ascribed to them in Figures 1 and 2. The aircraft is to be flown over point T′, which is displaced from $T_X$ by the distance $T'T_X$.

The instrument has means as described below for altering the effective value of $\rho_1$ by the component $T_{R1}$ of $T_R(=T_XT')$ along the line $l_1$, which is $MT_X$, and for altering the effective value of $\rho_2$ by the component $T_{R2}$ of $T_R$ along the line $l_2$, which is $NT_X$. The effective primary and secondary radio distances corresponding to T′ are therefore $S_1M$ and $S_2N$, or $$l_1-MT_X \text{ and } l_2+NT_X$$

respectively. However, if arcs having these radii are struck from the respective relay stations as centers, the arcs intersect not at T′ but at some other point T. The second approximation underlying use of this instrument is the assumption that T′ and T are coincident. In practice, $T_XT'$ is so small compared with $l_1$ and $l_2$ that no perceptible error is observed in the practice of the invention, and in order to make the discrepancy evident at all it was necessary to show $S_1$ and $S_2$ many times closer to $T_X$ than would ever occur practically.

The reasoning leading to Equation (1) may be applied as follows to movement of the aircraft toward P instead of toward $P_X$, the specified assumptions being made.

$$\dot{r}_1=\frac{\rho_1+T_{R1}}{t}$$

and $$\dot{r}_2=\frac{\rho_2+T_{R2}}{t}$$

from which may be derived the equation $$\dot{r}_1/\dot{r}_2=(\rho_1+T_{R1})/(\rho_2+T_{R2}) \qquad (2)$$

This is a condition for movement of the aircraft along a straight line from its location at T to the virtual destination $T_1$, and like Equation 1 it is found that only this course satisfies the Equation 2.

*Structure of the navigating component*

Figures 5, 7, 8, 9:
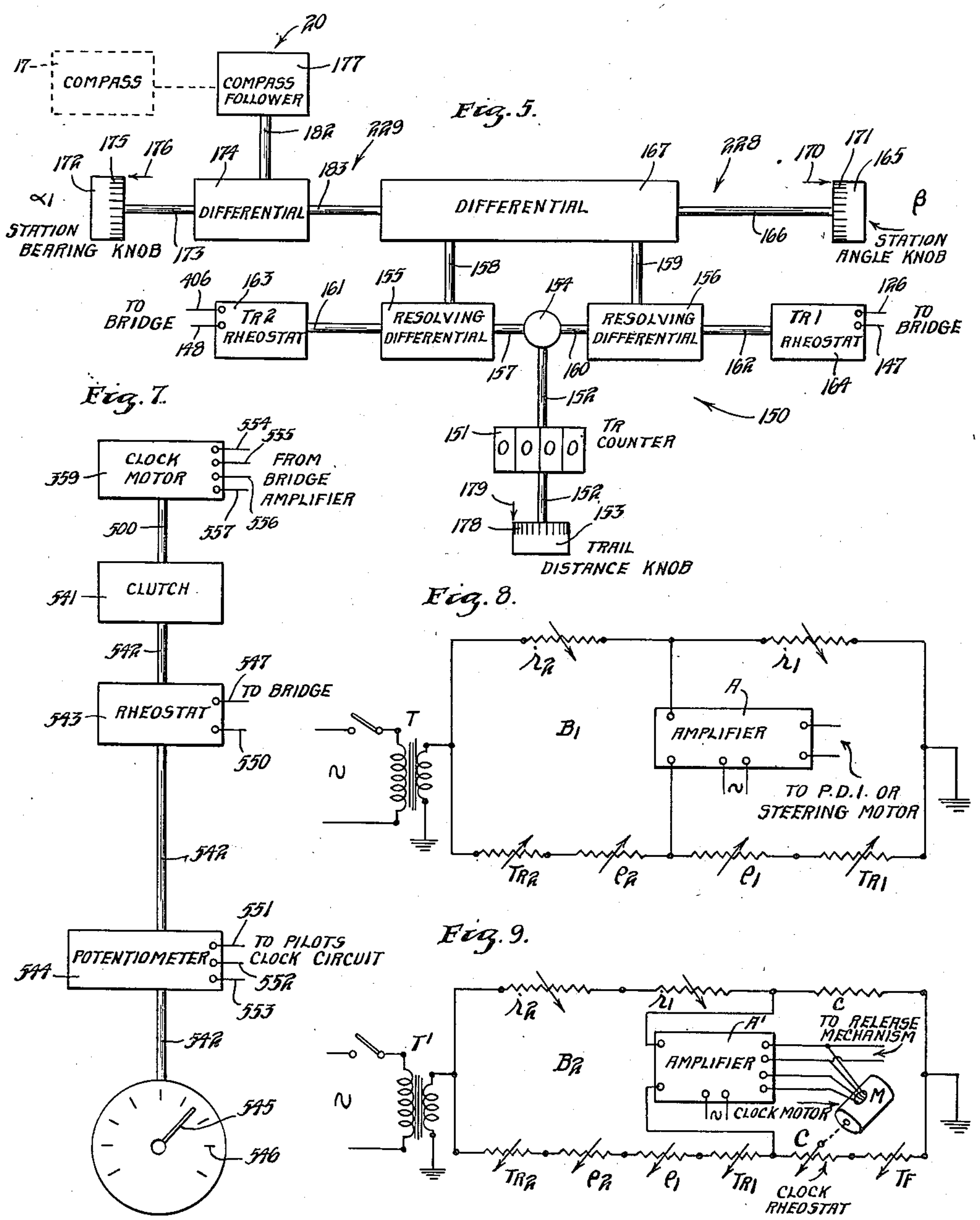
Figures 8 and 9 are simplified wiring diagrams of bridges comprised in the invention.

Mechanical schematic showings of the structure provided in the invention to set up and maintain the condition represented by Equations 1 and 2 comprise Figures 4 and 5 of the drawing. Figure 4 is symmetrical, primary elements on the right of the vertical center line actuating the primary phase shifter whose function is associated with the primary radio distance and comprising a $\rho_1$ mechanism 9, and secondary elements on the left of the center line actuating the secondary phase shifter whose function is associated with a secondary radio distance and comprising a $\rho_2$ mechanism 139.

Figure 11:
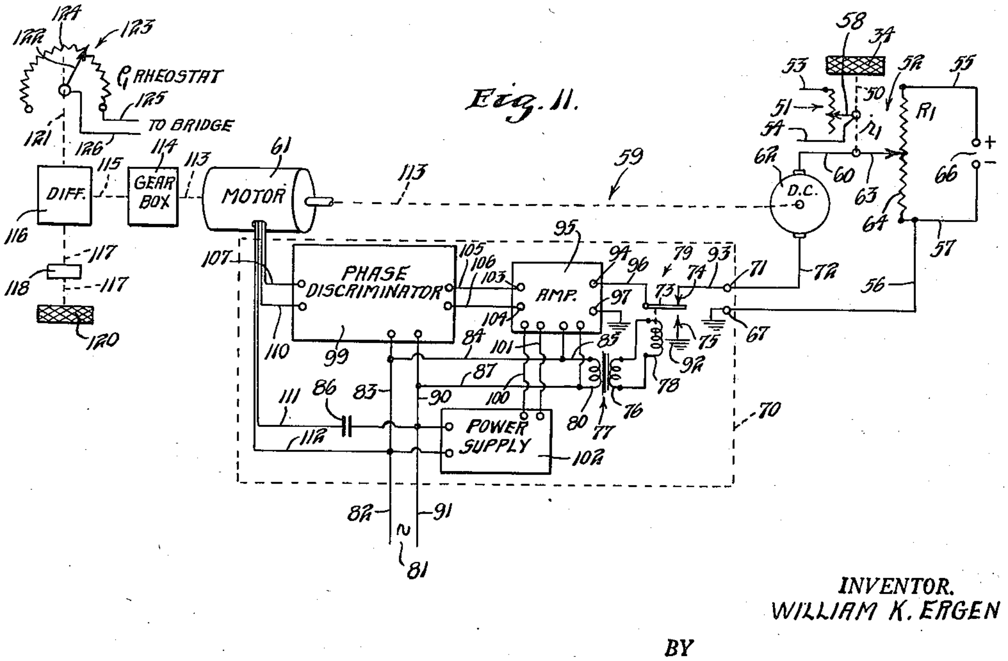
Figure 11 is a schematic showing of one of the motor control systems embodied in the invention.

In Figure 4, a manual adjustment knob 34 actuates a gear 36 which in turn meshes with a second gear 37 carried on a shaft 40. Shaft 40 drives a second shaft 50 through a reversing gear mechanism 41, the drive being reversed by operation of a reversing lever 42 actuated by a shaft 43 for operation by a manual knob 44. Knob 44 carries an index 45, moving between fixed graduations 46 and 47, the former identifying forward or direct drive through the gear mechanism and the latter indicating reverse drive. Shaft 50 actuates a pair of variable resistors 51 and 52, the former being a rheostat and the latter a voltage divider or potentiometer. Rheostat 51 is connected in an electric bridge system, presently to be described, by conductors 53 and 54. Potentiometer 52 is connected in a motor control system 59, which will be referred to as the $r_1$ system, by conductors 55, 56, 57 and 60. System 59 is illustrated in Figure 11, in which potentiometer 52 is shown to have a slider 63 and a winding 64. Conductors 55 and 57 are connected to the terminals of winding 64 and energize it with constant unidirectional voltage from a source 66 in such fashion that the upper terminal of the winding is positive. Source 66 may be a battery or the regulated output of a conventional rectifier and filter. Conductor 56 connects the lower or negative terminal of winding 64 with the grounded input terminal 67 of variable speed motor control 70 whose other terminal 71 is connected by conductor 72 with one terminal of a direct current generator 62: conductor 60 connects the other terminal of generator 62 with slider 63. By these connections, the voltage impressed between terminals 67 and 71 is the sum of the generated voltage and the potential difference between slider 63 and conductor 57 resulting from displacement of the slider from its lowermost position. The output voltage of generator 62 depends on the speed at which it is operated, and the magnitude of the voltage provided by source 66 may be so chosen that a suitable position of slider 63 on winding 64 introduces into the circuit a voltage which is equal and opposite to that produced by the generator at any given speed of operation. It will be seen that the above recited arrangement provides means giving electrical response to departure in the speed of the generator from a predetermined value at which the output of the generator equals the voltage due to the particular setting of slider 63. The voltage between terminals 67 and 71 is accordingly a reversing voltage, depending on whether the speed of the generator 62 is greater or less than that desired.

Motor control 70 is shown to comprise a vibrator 79 including a winding 78, a vibrating contact 73, and a pair of fixed contacts 74 and 75. Winding 78 is energized from a secondary winding 76 of a transformer 77 having a primary winding 80 which is energized from a suitable source 81 of alternating current through a circuit which may be traced through conductors 82, 83, 84, and 85, primary winding 80, and conductors 91, 90, and 87. Energization of winding 78 is effective in conventional fashion to cause vibrating arm 73 to move back and forth between its fixed contacts at a speed determined by the frequency of source 81. Fixed contact 75 is grounded as at 92: fixed contact 74 is connected with input terminal 71 by conductor 93. Vibrating contact 73 is connected by conductor 96 to one input terminal 94 of an amplifier 95: the other terminal 97 of amplifier 95 is grounded. Operation of vibrator 79 when energized from source 81 is thus effective to alternately impress between terminals 94 and 97 a voltage equal to the sum of the generator and potentiometer voltages and supplied to input terminals 67 and 71, and to short-circuit the amplifier terminals so that there is no voltage between them. This operation is in every respect analogous to the conventional vibrator power supply, except that instead of being impressed on a power transformer to provide high voltage, the vibrator voltage is impressed directly on the input of an amplifier.

Amplifier 95 is provided with heater energization from source 81, and with plate energization through conductors 100 and 101 from a power supply 102 of conventional construction which is also energized from source 81. The function of amplifier 95 is to provide at its output terminals 103 and 104 an amplified voltage of the same wave form as that impressed upon its input terminals, that is, pulsating voltage having maxima and minima either in phase with the source 81 or 180° out of phase with it, depending upon whether the generating voltage or the potentiometer voltage applied to the vibrator is the larger.

The output of amplifier 95 is impressed on the input of a phase discriminator 99 by conductors 105 and 106. The discriminator is energized from source 81, and its output conductors 107 and 110 energize one phase of the split-phase motor 61 with a periodic current having the same phase as that sent to the discriminator. The other winding of motor 61 is energized from source 81 through conductors 82, 112, and 91, condenser 86 and conductor 111.

Motor 61 is constructed and connected, in a fashion well known to those skilled in the art, so that it operates in a first or forward direction when the voltages energizing the two windings are in phase quadrature in a first sense, and in a second or reverse direction when the voltages energizing the two windings are in phase quadrature in the opposite sense. When only one of the windings is energized the motor acts as a brake on the rotor shaft.

Shaft 113 of motor 61 is connected in driving relationship to generator 62, and also, through a gear box 114 if necessary, with one shaft 115 of a differential 116. The second shaft 121 of differential 116 moves the slider 122 of a rheostat 123 along its winding 124, changing the resistance of the rheostat effective between its leads 125 and 126. The rotation of a third shaft 117 of differential 116 is opposed by a friction means 118. Shaft 117 is extended to perform other functions more clearly shown in Figure 4, to which reference should now again be made.

In Figure 4, shaft 117 is shown to pass through a second reversing gear mechanism 127 having an actuating lever 130 connected to the same shaft 43 as that driving lever 42, and to carry on its outer end a knob 120. For the sake of simplification all gear reductions other than differential gearing have been omitted from Figure 4, with the exception of certain power transmission arrangements, to the input of one of which, 131, a shaft is connected which is operatively connected to, and revolves with shaft 121 and hence bears the same reference numeral. Rotation of shaft 121 is transmitted through unit 131 in the form of rotation of further shafts 132, 133, and 134.

Shaft 132 operates a mechanical counter 135. Shaft 133 is connected through a third reversing gearing 136, a shaft 137 and suitable mechanical coupling and release means 144 to the shaft 33 of the primary phase shifter. Reversing mechanism 136 is actuated by a reversing lever 140 connected to the same shaft 43 as are reversing levers 130 and 42. Operation of knob 44 is therefore effective to reverse the direction of movement of the sliders of rheostat 51 and potentiometer 52 for a given rotation of knob 34, to reverse the direction of rotation of input shaft 117 of differential 116 for a given direction of rotation of knob 120, and to reverse the direction of rotation of the phase shifter shaft 33 for a given direction of rotation of shaft 133. Knob 44 is to be in its "forward" position when the craft is approaching its destination $T_x$ in either the first sector or the second sector, and is to be turned to its reverse position when the craft is approaching its destination in the third sector or the fourth sector. Shaft 134 comprises one of the mechanical inputs to a further differential 141.

The members thus far referred to by the numerals 34 to 140 inclusive comprise the primary radio distance or $\rho_1$ mechanism, which has been identified by the numeral 9. Each of these components has its exact counterpart in structure and function in the $\rho_2$ mechanism which is identified by the reference numeral 139. The second mechanism need not therefore be considered in detail at the present time although reference will be made to certain of the elements later.

There remains for present discussion in connection with Figure 4 only the further structure associated with differential 141. As previously pointed out, the rotated position of shaft 33, when the pulses of the primary oscilloscope are in alignment, is a measure of the distance from the aircraft to base station $S_1$, and since $I_1$ is constant it is possible by proper selection of gear ratios to construct counter 135 to give a continuous indication of $\rho_1$. Similarly, a counter 520 in the $\rho_2$ mechanism may be constructed for operation concurrently with shaft 35 to give an indication of $\rho_2$. A shaft 138, analogous to shaft 135, and connected to counter 520 and secondary phase shifter shaft 35, provides a second mechanical input to differential 141, and the output shaft 142 of the differential is connected to operate still another counter 143. Since counter 143 is influenced jointly by the factors operating counters 135 and 520, the indication of counter 143 is an approximation of the straight line distance L to the desired destination: the approximation is not exact since the angle $\beta$ varies, but it serves to give a rough idea of the distance L, and its accuracy increases as the aircraft approaches its destination.

Figure 5 schematically discloses a trail resolving mechanism generally referred to by the reference numeral 150, intermediate gearing being omitted. As pointed out above, the trail distance of a body falling from an aircraft in sustained rectilinear motion is in the vertical plane including the longitudinal axis of the aircraft at the moment of impact, and for any particular configuration of carrier its magnitude can be determined readily from tables. A counter 151 has an operating shaft 152 and is adjustable by means of a manual knob 153 to indicate the value of trail thus determined: then the amount of rotation of shaft 152 is a mechanical measure of the trail distance. Knob 153 may bear a scale 178 moveable with respect to a fixed index 179. The extension of shaft 152 beyond counter 151 acts through a mechanical transmission 154 to insert a first mechanical input into each of two resolving differentials 155 and 156 by means of shafts 157 and 160. Differentials 155 and 156 receive second mechanical inputs through means 158 and 159. The detailed structure of the differentials will be set forth in the discussion of Figures 13 to 17; at present it is sufficient to say that the function of each of these differentials is to cause rotation of an associated rheostat to an extent proportional to that component of the trail distance of the carrier having the direction of one of lines $S_1T_x$ and $S_2T_x$.

The mechanical outputs of differentials 155 and 156 comprise shafts 161 and 162, which actuate rheostats 163 and 164, respectively. The rheostats are provided with electrical conductors 126, 147 and 148, 406 for connecting them in electrical circuits presently to be described.

It will be appreciated that in flying to different destinations the angle between the lines $S_1T_x$ and $S_2T_x$ will be found to vary, and means for adjusting the effect of a change of this angle on the instrument must be provided: such an adjustment is brought about by manual operation of a knob 165, whose shaft 166 provides a first mechanical input to a differential 167. A suitable index 170 and scale 171 may be provided so that the proper position of knob 165 may at all times be maintained.

It will also be apparent, the wind vector being essentially constant for any particular approach to a destination, that any change in the direction of the air speed vector changes the whole wind triangle. This means that some sort of a device must be provided to correct the instrument for any change in the heading of the aircraft, and a basis for making this measurement is found in the magnetic heading of the aircraft at any time and the magnetic bearing of the destination from one of the relay stations, $S_1$. A knob 172 is provided on a shaft 173 which gives a mechanical input to a differential 174, and a scale 175 is moved with respect to an index 176 to give a reading of the angle $\alpha_1$ in Figure 1. A second input from the repeater 177 of the magnetic compass 17, to which it is connected by any suitable telemetric means 20 is also fed into differential 174 by a shaft 182. The output of differential 174 is fed through a shaft 183 to comprise a second mechanical input to differential 167. Mechanical output is derived from differential 167 by means 158 and 159 already identified.

*Structure of the trail resolver*

For a detailed description of the trail mechanism just described generally, reference is now made to Figures 13, 14, 15, 16, 17, and 18, in which elements identified in Figure 5 bear the same reference numerals. The device comprises a means for determining mechanically, within its limits, the length of the projections, on two lines having any angular relationship, of a third line of variable length having any angular relationship with one of the first two lines. As applied in the present application, the device determines the length of the components, along lines joining the base stations with the destination, of the trail distance of the cargo carrier measured in the direction of the longitudinal axis of the aircraft.

Figure 13:
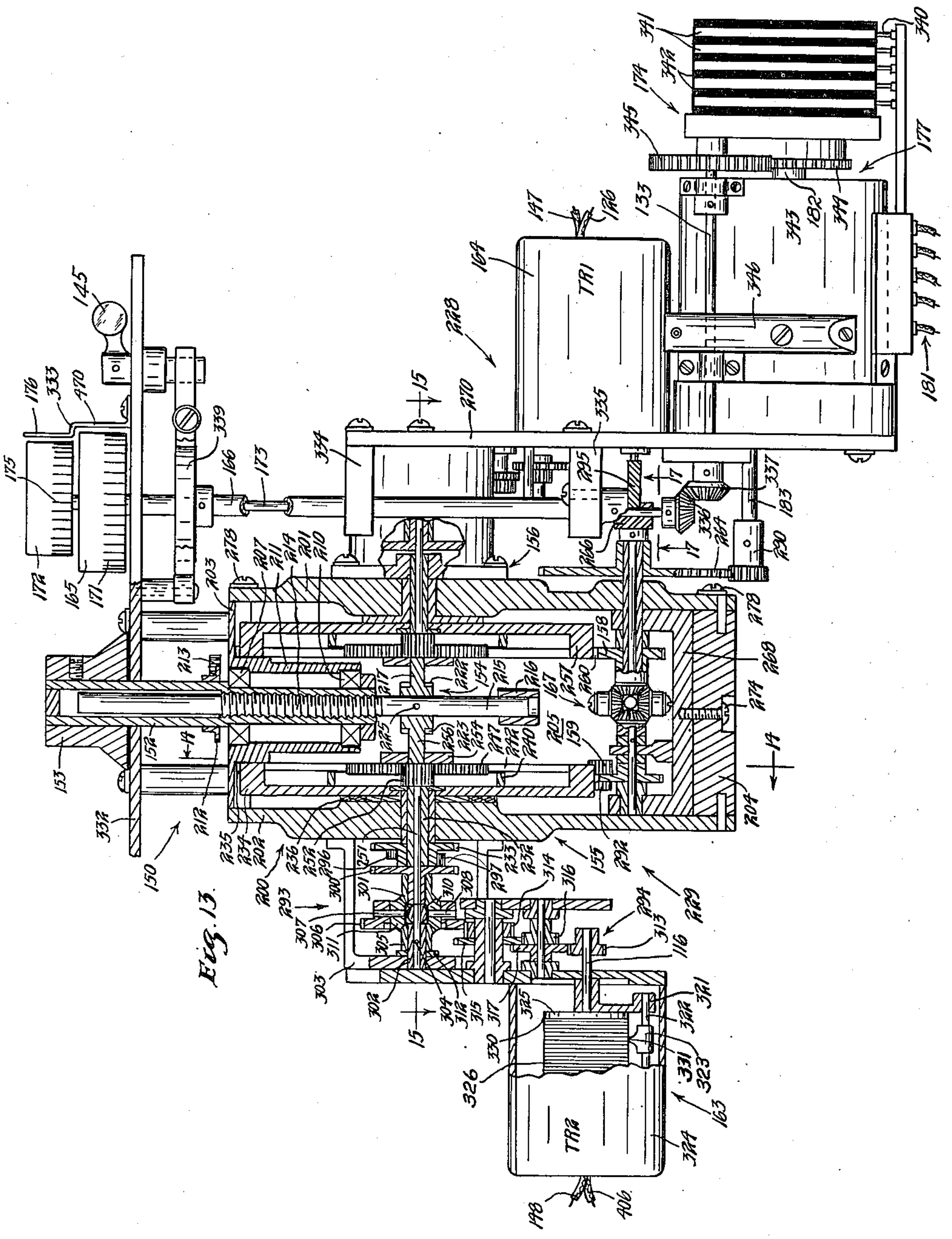
Figures 13, 14, 15, 16, 17 and 18 are views of a vector resolver comprised in the invention, parts being sectioned or broken away to more clearly disclose the invention.
Figure 18:
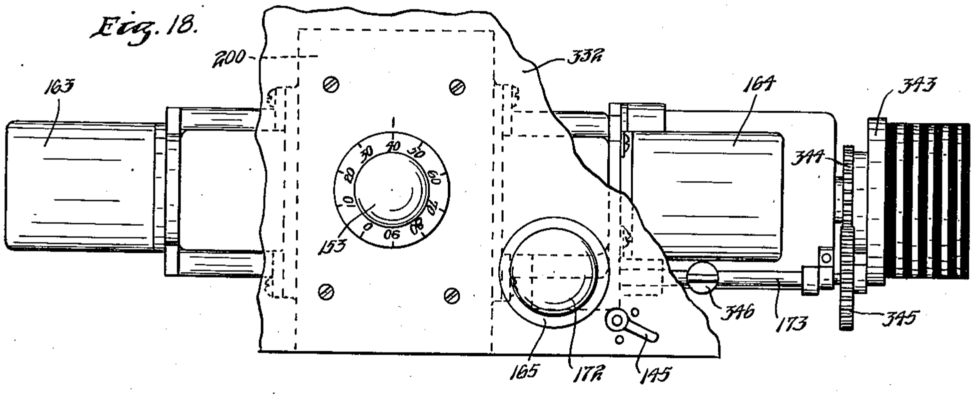

Figure 18 is a front elevation of this component of the invention, and Figure 13 is a bottom view of the same structure, parts being shown in section or broken away to more clearly disclose the invention.

In Figure 13, knob 153 is provided for setting the magnitude of the trail distance along the axis of the aircraft, knob 165 is provided for setting into the mechanism the angle between the two lines from the stations to the destination, and knob 172 is provided to set the mechanism for the magnetic bearing of the line joining the first base station with the destination.

Figure 14:
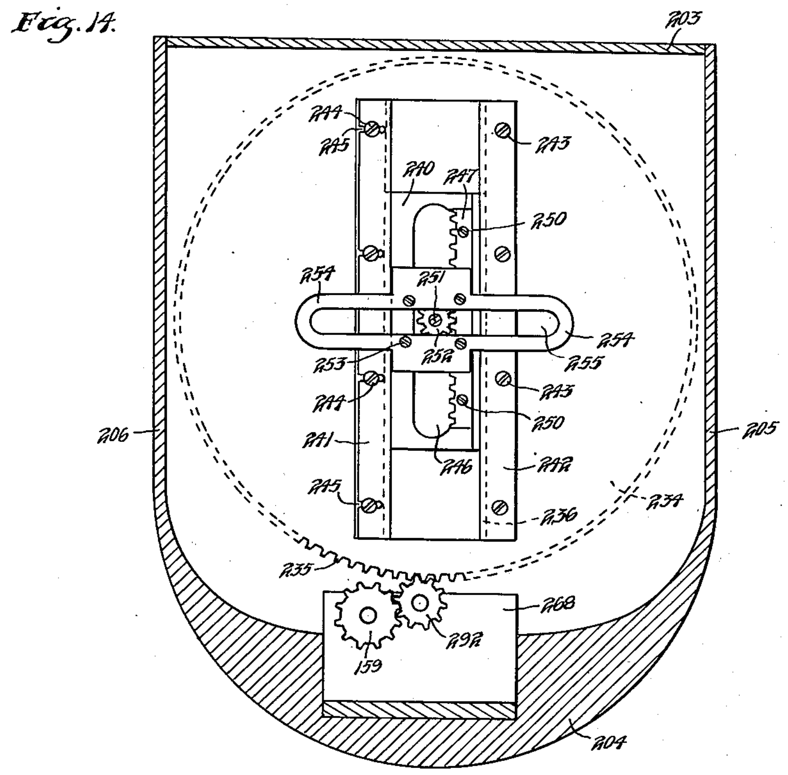

The structure of the mechanism centers around a housing 200 having a removable side wall 201, a fixed side wall 202, front and rear walls 203 and 204, a top 205, and a bottom 206, best seen in Figure 14.

Figure 15:
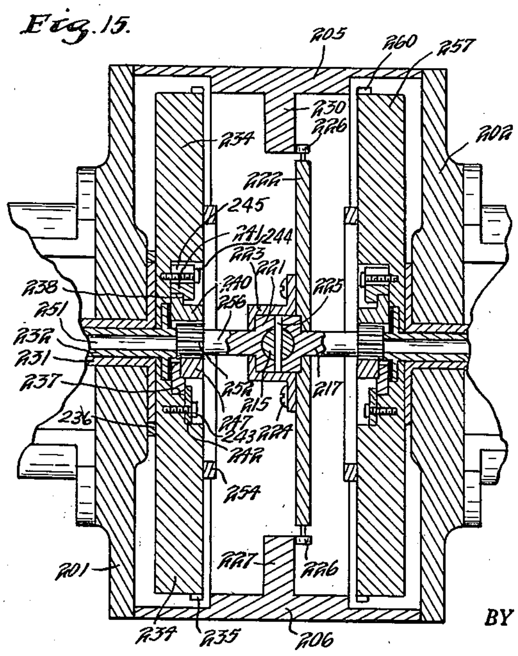

Knob 153 is mounted on shaft 152, which is carried in bearings 207 and 210 in a boss 211 which comprises a portion of front wall 203. Shaft 152 carries a gear 212 meshing with a gear 213 driving counter 151 which does not appear in Figure 13. Shaft 152 is internally threaded for a portion of its length as at 214, and engages external threads on a rod 215. This rod has an outboard bearing 216 which comprises a portion of the housing 200. A cross-arm 217 is fixed to shaft 215 by a pin 225. Reference should now be made to Figure 15, which is a sectional view taken along the lines 15—15 of Figure 13. Cross-arm 217 has an enlarged central portion 221 about which a member 222 is fastened in cooperation with a clamping piece 223 by suitable machine screws 224. The extremities of member 222 are machined to be received in and fastened to miniature antifriction bearings 226. These bearings engage the surfaces of flanges 230 and 227 extending along the top and bottom, respectively, of the housing. Members 217 to 230 cooperate to prevent rotation of shaft 215 about its axis, while permitting it to slide freely in a direction parallel to its axis.

Mounted in a suitable bearing 231 in wall 202 of housing 200 is a hollow shaft 232 carrying on its end external of the housing a spur gear 233 and on its end internal of the housing a relatively large disk 234 having gear teeth 235 around its periphery. An annulus 236 of friction material is provided between disk 234 and housing wall 202 so that considerable mechanical effort is required to cause rotation of the disk. In disk 234 there is formed a rectangular mortise 238 having a raised ledge 237 extending along the bottom on one side. Ledge 237 acts as one side of a track for a carrier 240, and an adjustable member 241 forms the other side of the track and also has a shoulder for holding the carrier in the track: a separate member 242 cooperates with ledge 237 to restrain the carrier within the track on the other side of the mortise. Member 242 is supported on ridge 237 by suitable machine screws 243, and member 241 is adjustably fastened to the bottom of the mortise by machine screws 244 which pass through slots 245 in member 241, thus allowing it to be moved nearer to or farther from carrier 240 to give proper snug fit therebetween. The structure is also shown in Figure 14, which is a sectional view taken along the lines 14—14 in Figure 13 and rotated in a clockwise direction through 90°.

An elongated recess 246 passes completely through carrier 240. A rack 247 is mounted on carrier 240, so that its teeth project inwardly of the recess, by suitable means 250. A shaft 251 passes through hollow shaft 232 and through the aperture in carrier 240, and bears at its inner end a pinion 252. It will be observed that the end of pinion 252 is flush with surfaces of rack 247, cross-arm 217, and carrier 240.

Mounted on carrier 240 by suitable machine screws 253 is a yoke member 254. Yoke 254 has an elongated slot 255 piercing it, and is mounted on carrier 240 in such fashion that the axis of the slot in the yoke member is perpendicular to the axis of the recess in the carrier. The width of slot 255 is the same as the diameter of the end 256 of cross-arm 217, which performs the functions of members 157 and 160 in Figure 5.

From the mechanism just described it follows that rotation of disk 234 about its axis, the yoke member being held at the center of the disk, brings about equal rotation of hollow shaft 232 and solid shaft 251, and that displacement of yoke member 254 from its central position, while disk 234 is held fixed, is effective to bring about rotation of solid shaft 251 without rotating hollow shaft 232. If yoke member 254 is displaced from its central position and disk 234 is also rotated, there results rotation of hollow shaft 232 to the same degree as that of disk 234, and rotation of shaft 251 to a degree influenced both by the rotation of disk 234 and by the displacement of yoke 254.

The mechanism identified by reference numerals 231 to 256 will be referred to as the $T_{R2}$ mechanism 228, and is duplicated by a $T_{R1}$ mechanism 229 on the other side of flanges 227 and 230, except that no friction member corresponding to member 236 is in this case provided. For the purpose of the present disclosure it appears sufficient to give specific reference numerals only to certain of these duplicate members, including disk 257 and its toothed portion 260, which correspond to disk 234 and its toothed portion 235.

Members 231 to 256 inclusive comprise a portion of differential 155 as indicated in Figure 5, and the corresponding members including 257 and 260 comprise a like portion of differential 156. Before discussing the remaining portions of differentials 155 and 156, however, it appears desirable to consider the means bringing about rotation of disks 234 and 257.

Figure 16:
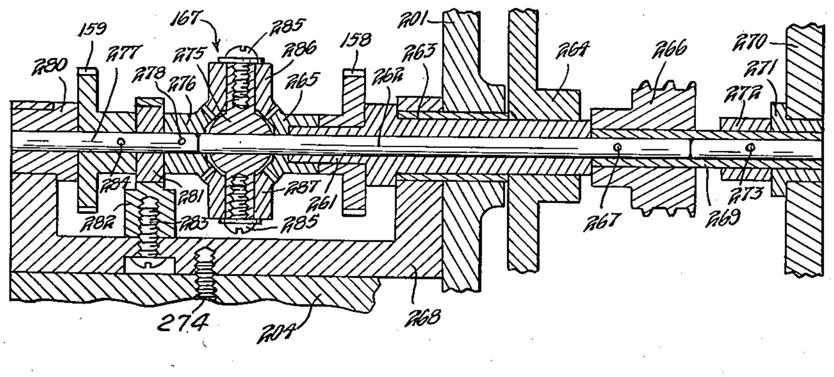

As shown in Figures 13 and 16, the latter being a fragmentary enlargement, wall 201 is traversed by a further pair of shafts 261 and 262, the latter being solid and contained within the former which is hollow. Hollow shaft 261 is carried in a bushing 263 which has a press fit in a mounting 268, but a snug sliding fit in wall 201. Hollow shaft 261 carries external of wall 201 a gear 264, while internal of wall 202 the shaft carries a smaller gear comprising means 158 of Figure 5, and a bevel gear 265.

Outwardly, shaft 262 extends beyond the end of shaft 261, passing part way through a sleeve 269, within which it terminates. A gear 266 is fastened to shaft 262 and sleeve 269 by a pin 267. An outboard bearing 270 is provided, and sleeve 269 traverses a bushing 271 in member 270. A collar 272 is fastened to sleeve 269 by a pin 273. It is thus apparent that by removing pins 267 and 273, sleeve 269 can be drawn to the right as shown in Figure 16, thus releasing all constraint on shaft 262 outside of wall 201. Similarly, by releasing the set screw or other means holding gear 264 on hollow shaft 261, all restraint on that shaft external of wall 201 is released. By these mechanical expedients there is provided a simple means for obtaining access to the interior of housing 200, wall 201 being removable by sliding along shaft 261 when the machine screws 278 holding the wall to the housing are removed. It will be realized that means similar to those described are also provided for freeing other shafts passing through the wall 201.

Mounting 264 is fastened within housing 200 by suitable means which may include a machine screw 274. Thus the removal and inspection of the differential disclosed in Figure 16 and about to be described is facilitated.

In Figure 16, the continuation of shaft 262 internally of the housing and of member 264 is shown to extend in driving relation through a spider 275, and to be received within but not fastened to a second bevel gear 276. The latter bevel gear is carried by a shaft 277 which is supported at one end in a bushing 280 in member 268, and at the other end in a bushing 281 in an outboard bearing 282 fastened to member 268 by suitable means 283. Since shafts 277 and 262 are coaxial, it will be apparent that the projection of shaft 262 within bevel gear 276 provides an inboard bearing for shaft 262. A gear comprising means 159 as shown in Figure 5 is also fastened to shaft 277, as by a pin 284. It will be observed that gear 159 meshes with teeth 235 on disk 234 through an idler 292, while gear 158 meshes with disk 257 directly.

Mounted on spider 275 by suitable means such as screws and washers 285 are two further bevel gears 286 and 287, spaced 180 degrees about the axis of shaft 262. Members 261, 262, 265, and 276 to 287 comprise differential 167 as shown in Figure 5, shaft 183 being coupled to the differential by a pinion 290 acting on gear 264, and shaft 166 being coupled to the differential through a gear 295 engaging gear 266. Gear 158 meshes with the toothed portion 260 of disk 257, and gear 159 meshes with an idler 292 which in turn engages the toothed portion 235 of disk 234.

The remaining mechanism associated with differential 155 will now be described, reference being again made to Figure 13, and includes a further mechanical differential 293 and a gear train 294, together comprising means 161 in Figure 5, and rheostat 163. Externally of wall 202 gear 233, carried by hollow shaft 232, meshes with the first of a pair of idlers 296 and 297. The idlers mesh with one another, and idler 297 engages a second gear 300 having a hub to which is fixed a bevel gear 301. Shaft 251 traverses gear 295, gear 300, and gear 301 and is received in a bushing 302 in an outboard bearing member 303. Fastened to shaft 251 as by a pin 304 is a bevel gear 305. An externally toothed disk member 306 is hollow in its center, and carries on internally directed radial pins 307 and 308 a pair of bevel gears 310 and 311. Pins 307 and 308 extend through bevel gears 310 and 311 for radial contact with a suitable bearing surface 312 carried by shaft 251. Thus means are provided for rotating disk 306 about shaft 251. Disk 306 drives a pinion 313 through a gear train including gears 314, 315, 316, and 317 mounted on suitable shafts.

Pinion 313 is carried on the shaft 161 of rheostat 163 and supports and drives an insulated arm 321 carrying a pair of rods 322 along which there is adapted to slide a contact carrier 323. Resistor 163 also includes a housing 324 on which there is mounted a drum 325 carrying a winding of resistance wire 326. Winding 326 is comprised of two sets of conductors side by side, first ends of the conductor being connected together as at 330 while the other ends are brought out of the housing to provide the connections to the rheostat as shown at 148 and 406. The circuit through the winding then starts with conductor 148 and goes through the housing, traverses the coil to the opposite end, when the first conductor joins to the second conductor: the circuit then retraverses the core back to the other end, and is connected to lead 406.

Contact carrier 323 carries a metallic contact 331 which is adapted to bridge between the two wires just described, thus short circuiting the portion of the resistance winding extending from the bridging contacts to the common point of the wires and therefore decreasing the resistance of the resistor by an amount depending upon the displacement of the contact carrier from member 321. Contact 331 fits between the two wires and moves carrier 323 along its rods 322 as the arm is rotated. Full details of a rheostat of this general nature are disclosed in the copending application of Albert Palya, Serial No. 511,833, filed November 26, 1943, and the showing of the rheostat is here made rather schematic than mechanical since the details of the structure comprise no part of this invention.

A mechanism identical in all respects to that just recited is provided completing differential 156 and connecting it with rheostat 164.

Knobs 153, 165, and 172 are mounted adjacent a panel 332, the latter carrying indices for cooperation with graduations on the various knobs. For instance, as shown in Figure 5, the sloping portion of knob 153 may bear graduations 178 for cooperation with a single index 179 carried by the panel. Knobs 165 and 172 are shown as bearing graduations 171 and 175, and an index carrier 333 suitably fixed on panel 332 is arranged to support indices 176 and 170 cooperating with the graduations on the knob. A braking means 339 of any suitable nature is arranged to releasably hold shaft 166 against rotation except when the brake release lever 145 is actuated.

Outboard bearing member 279 is provided with a pair of studs 334 and 335 which comprise bearings for shaft 166 carrying knob 165 and gear 295 on opposite ends. Shaft 166 is hollow, and is traversed by shaft 176 carrying on its outer end knob 172 and on its inner end a bevel pinion 336 meshing with a second bevel pinion 337. Gear 337 is carried on shaft 173.

As is well known to those skilled in the art, a compass follower is a means for producing between two members an angular displacement which is proportional to the displacement of the compass needle from its due north position. This is most easily accomplished by a telemetric system including transmitting and receiving electromagnetic devices, and use of such means is contemplated in the present invention. Thus conductors 181 lead from the transmitting device, and are connected by brushes 340 with slip rings 341 carried on a drum 342 of insulating material. Drum 342 is mounted unitary with the stator of the compass follower motor 177 while the rotor of the motor is connected to shaft 183. The stator, however, is mounted for rotation about the axis of shaft 183 in a housing 343, and rotation between the stator and housing 343 is brought about by the action of gears 344 and 345, the latter being carried on shaft 173. A friction braking arrangement for shaft 173 is shown at 346.

It will be apparent that if, under the influence of the compass, follower 177 is energized to cause the shaft 183 to rotate through 45 degrees with respect to the stator, and if at the same time rotation of the stator under the influence of gears 345 and 344 is brought about in the opposite direction through 45 degrees, the actual resulting rotation of gear 264 is zero, and that any interrelation between the action of the compass and knob 172, which drives gear 344 through the mechanism previously traced, may be obtained if desired.

Before describing the operation of the trail resolving mechanism described above, the normal condition of the mechanism will be defined. In this condition the compass system is energized: aircraft is heading due north: the line $S_1T_x$ is also due north: line $S_2T_x$ coincides with line $S_1T_x$: member 215 is in such a position that member 256 is coaxial with member 251: the zero graduations on knobs 172 and 165 are aligned with the zero indices 176 and 170: the zero graduation on knob 153 is in line with the index and counter 151 indicates zero; and the tracks on disks 234 and 257 are parallel to rod 215. It will be appreciated that this is a mechanical normal position rather than a practical position since, for example the stations $S_1$ and $S_2$ will not ordinarily be on the same line in actual use of the device.

*Operation of the trail resolver*

Since the trail resolving mechanism is a subordinate component of the invention which is complete in itself, its operation will be described now, to avoid complicating a later description of the invention as an entirety. Knob 153 is first set at its zero position, in which counter 151 and scale 178 both read zero. When this is done, cross-arm 217 is aligned with the axes of discs 234 and 257. Under these conditions, resistors 163 and 164 are adjusted to zero resistance.

The initial set up of the apparatus is such that when the craft is headed due north, so that compass follower motor 177 is set at zero degrees, and when knobs 165 and 172 are set at zero also, discs 234 and 257 are rotated to positions where carrier 240 and the like carrier on disc 257 move parallel to each other and to rod 215.

As the craft changes heading from due north the rotor of compass follower motor 177 is energized and shaft 183 is rotated. This acts through pinion 290, gear 264, and shaft 261 to drive gear 158 and bevel pinion 265. The former gear meshes with the teeth in disc 257 directly. The bevel pinion engages bevel pinions 286 and 287: since spider 275 is held motionless by shaft 262, due to its interconnection through gears 266 and 295 with shaft 166 which is locked by brake 339, rotation of pinions 286 and 287 causes rotation of bevel pinion 276, and with it shaft 277, in the opposite direction to the rotation of shaft 262. This results in rotation of gear 159, which acts through idler gear 292 to engage the teeth of disc 234. Interposition of the idler introduces another reversal of direction, so the two discs are actually driven in the same direction. The gear ratios and motor drive characteristics are so chosen that one degree of change in the heading of the craft results in one degree of rotation of discs 234 and 257.

By reference to a map of the area to be flown over, the value of angle $\beta$ can be determined: in Figure 1 this angle happens to be 43 degrees. Brake 339 is released, and knob 165 is rotated so that index 170 is opposite the 43 degree mark on scale 171: brake 339 is then again applied. This rotation of knob 165 is effective, through shaft 166, gears 295 and 266, and shaft 262 to rotate spider 275 about the axis of shaft 262. Since bevel pinion 276 is fixed by the interengagement of gear 159, through idler 292, with disk 234, which is held by friction means 236, rotation of the spider is effective only to rotate bevel pinion 265, gear 158, and disk 257: the gear ratios 295:266 and 158:260 are so chosen that rotation of knob 165 through a given angle causes equal angular motion of disk 257.

In Figure 1 the bearing of line $S_1T_x$ is not north, but 101 degrees east of north. Knob 172 is accordingly rotated until graduation 101 on its scale 175 is opposite index 176. This acts through shaft 173, gears 336 and 337, shaft 133, and gears 345 and 344, to rotate the stator of the compass follower. Electrical energization from the transmitter at the compass acts to maintain the stator and rotor in their same rotational relationship, so the rotor follows the stator, and as a result gear 290 rotates gear 264 and hence gear 158 and bevel pinion 265, exactly as described in connection with change in the heading of the craft. The mechanical train from knob 172 to the gear teeth on disks 234 and 260 is so chosen that rotation of knob 172 through a given angle results in rotation of the disks through the same angle and in the same direction.

From a knowledge of the configuration of the cargo carrier to be released, the proposed airspeed, and the altitude from which the carrier is to be released, it is possible to determine with the aid of a table of trail distance the value of this factor which should be set into the instrument. The various components of the mechanism are so selected that one rotation of knob 153 is proportional to a known trail distance, 100 feet for the sake of illustration. Then if the value of trail for the conditions under which the flight is to be made turns out to be 472 feet for example, knob 153 is rotated until counter 151 indicates 4 and graduation 72 on the scale of knob 153 is opposite to index. Other mechanical relationships can of course be used at will.

Rotation of knob 153 has the effect of displacing member 217 away from its axial alignment with the axis of shaft 251, thus moving yoke 254 in its track.

The effect of rotation of either of the disks 257 and 234, when its associated yoke is displaced from its central position, takes place in the same fashion. This operation will be described in connection with rheostat 163.

The amount of displacement of yoke 254 from its central position is proportional to the cosine of angle of the rotation of disc 234 and to the displacement of cross-arm 217. This yoke displacement is transformed into rotation of shaft 251 by the interaction between rack 247 and pinion 252: the rotation of shaft 251 with respect to disk 234, that is with respect to shaft 232, is therefore proportional to the displacement of yoke 254. However, the desired output is a change in resistance of rheostat 163, neither portion of which is carried by disk 234, which it must be remembered has rotated with respect to the housing. The rotation of shaft 251 with respect to the housing is therefore not proportional to the movement of the yoke, the disproportion being due to the rotation of disk 234. Means are provided for modifying, in accordance with the rotation of disk 234, the rotation of the shaft 161 of rheostat 163 caused by rotation of shaft 252.

To accomplish this modification, the rotation of shaft 251 is fed into differential 293 through bevel pinion 305, while that of shaft 232, reversed by gears 296 and 297, is fed into the same differential through bevel pinion 301. The resulting rotation of disk 306 is the difference between the rotation of pinion 252 and disk 234, and is transmitted to the shaft of rheostat 163 through gear train 294.

In the problem on the ground, the station lines are fixed and the trail direction varies with the heading of the aircraft. In the mechanism it is found easier to maintain the direction of the trail member fixed and rotate the station lines about it, which is the full equivalent once the system has been coordinated for true north heading and true station bearing. The change in angle between the station lines and the aircraft heading can thus be brought about by the same mechanism and in the same manner as was the change in station bearing just described. For example, if Figure 1 represents a no-wind condition, the course $PT_x$ of the aircraft is also its heading, which is 58 degrees east of north.

As the aircraft takes that heading, a signal from the compass transmitter causes rotation of shaft 183 of the follower rotor with respect to the stator, which is fixed by gears 344 and 345 and friction means 346. This rotation of shaft 183 brings about rotation of disks 234 and 257 until they are both displaced, from their positions for due north heading of the aircraft, by an angle of 58 degrees, adjustment of the resistances of resistors 164 and 163 taking place as described above. The result of this is that within the housing, shaft 215 and the tracks on disks 257 and 234 have the same angular relation about the axes of the disks as do lines $PT_x$, $S_2T_x$, and $S_1T_x$ in Figure 1, and continuous operation of the compass maintains this relation as $PT_x$ changes direction.

From the above described mechanism, it follows that means have been here provided for varying the resistances of resistors 160 and 163 in accordance with the values of the projections, on lines having the angular relationship of lines $S_1T_x$ and $S_2T_x$, of a quantity having the arithmetic value of the trail for the particular body in question, and having the direction of the heading of the aircraft with respect to the lines just recited.

The basic amount by which the resistors are to be varied is determined by the setting of knob 153, which displaces the yokes and rotates the shafts driving the resistors by rack and pinion action. The basic rotation is modified by rotation of the resistor shafts brought about by rotation of discs 257 and 234, which is accomplished in equal amounts by knob 172 or compass follower 343 and unequally by knob 165. As a result of these modifications, the resistances actually set into resistors 164 and 163 have the same ratio as do the components of the trail distance along the lines $S_1T_x$ and $S_2T_x$ in the actual problem.

*The navigating bridge*

Before considering the course-directing aspect of the invention as a whole, attention is directed to Figure 8, which is a schematic diagram of the bridge circuit on which operation of the invention is based, and which has been simplified to more clearly point out its basis of operation. In Figure 8 a resistance bridge $B_1$ is shown as being made up of four resistors, the bridge being energized with alternating current from a transformer T and the unbalance of the bridge being fed to an amplifier A. Arms of the bridge adjacent a first bridge output terminal are shown as having the values $\dot{r}_1$ and $\dot{r}_2$. Each of the remaining arms of the bridge comprises two resistors, those connected between $\dot{r}_1$ and the second output terminal having the values $T_{R1}$ and $\rho_1$ and those in the remaining arm having the values $\rho_2$ and $T_{R2}$. According to the elementary principles of bridge circuits of this type, the bridge will be in balance when the condition $$\dot{r}_1/\dot{r}_2=(T_{R1}+\rho_1)/(\rho_2+T_{R2})$$

prevails, and for all other conditions a signal will be supplied to the amplifier from the bridge, the phase of the signal reversing with reversal in the direction of unbalance of the bridge, as is well known. This simplified circuit should be borne in mind in considering the more complicated circuits of Figure 12 to which reference is now made.

The system is shown to comprise autopilot 10, course control unit 11, and instrument panel 13 (shown in two detached portions for simplicity in the drawing). Portions of $\rho_1$ mechanism 9 and $\rho_2$ mechanism 139, as well as portions of trail resolver 150, are shown, and source 81 of alternating voltage appears more than once on the drawing rather than multiplying long leads to common member. The $\dot{r}_1$ mechanism 59 and its comparable $\dot{r}_2$ mechanism 350 are shown in their proper cooperative relationship with the rest of the instrument.

In addition to the above components, further details most of which have already been given will follow, the invention comprises a regulating network 351, relays 352 and 357, an amplifier 353, electronic motor control means 349 including electron discharge tubes 354 and 355, motors 356 and 359, a transformer 360, a source 361 of direct current independent of the regulated sources in components 350 and 59, a locking switch 362, a plurality of knob switches 363, and suitable means connecting the various components into a coordinated instrument.

Relay 352, which extends vertically through the center of the figure, comprises a winding 364 in the lower portion of the figure and an armature 365 operating a plurality of switch arms 366, 367, 370, 371, 372 and 373 from normal engagement with a first set of fixed contacts 374, 375, 376, 377, 380, and 381, on energization of the relay, into operative contact with a second set of fixed contacts 382, 383, 384, 385, 386, and 387: fixed contact 384 is not used. Relay 352 functions, in its normal condition, to complete a normally energized bridge circuit 394 (shown in the left central portion of the figure), similar to bridge $B_1$ in Figure 8, having input terminals 390 and 391 and output terminals 392 and 393.

The circuit around bridge 394 may be traced as follows: input terminal 390, conductor 395, $\dot{r}_2$ resistor 396, conductor 397, terminal 392, $\dot{r}_1$ resistor 51, terminal 399, conductors 400 and 401, fixed contact 376, switch arm 370, conductor 398, input terminal 391, conductor 402, fixed contact 375, conductor 403, terminal 404, conductor 125, $\rho_1$ rheostat 123, conductor 126, $T_{R1}$ rheostat 164, conductor 147, output terminal 393, conductor 148, $T_{R2}$ rheostat 163, conductor 406, $\rho_2$ rheostat 407, and conductor 410. $\rho_2$ rheostat 407 is independently operated by a motor 408 and a knob 409 analogous to motor 61 and knob 120 of control system 59. $R_2$ rheostat 419 and $\dot{r}_2$ rheostat 396 are manually operable by a knob 418 analogous to knob 34.

Transformer 360 comprises primary winding 411 and a plurality of secondary windings 412, 413, 414, 415, and 416, all on a common core 417: the various secondary windings have been placed in various positions on the sheet to simplify the drawing. Primary winding 411 is energized from source 81 through switch 420, conductors 421 and 422, and ground connections 423 and 424.

In the normal position of the relay, secondary winding 412 of transformer 360 energizes the bridge 394, one end of the winding being connected to input terminal 390 through a limiting resistor 425, and the other end of the winding being connected to input terminal 391 through a limiting resistor 426, conductor 427, contact arm 367, fixed contact 375, and conductor 402.

Regulating network 351 comprises a pair of potential dividers 430 and 431 having sliders 432 and 433 and windings 434 and 435, the windings being connected in parallel by conductors 436 and 437. Sliders 432 and 433 are connected to terminals 440 and 441 of the regulating circuit. The parallel windings are energized from secondary winding 413 and transformer 360 through limiting resistors 428 and 429. Slider 433 may be operable by a manual knob 448, if desired: slider 432 is arranged for operation by a shaft 439 as will presently be set forth.

Amplifier 353 is of the type in which an amplified voltage is delivered having substantially the phase and wave form of the applied voltage: such amplifiers are well known to those skilled in the art. The input terminals of amplifier 353 are identified by numerals 442 and 443—the output terminals by numerals 444 and 445. Suitable power supply means are included in amplifier 353 whereby heater, bias, and anode voltages as needed are derived from source 81, which is connected to the amplifier as at 446 and 447. Amplifier input terminal 443 is grounded as at 449.

In the normal position of relay 352, bridge 394 is connected to amplifier 353 through regulating circuit 351 in a circuit which may be traced from input terminal 442 by conductor 450, switch arm 373, fixed contact 381, conductor 451, input terminal 440, regulator circuit 351, output terminal 441, conductor 452, switch arm 372, fixed contact 380, conductor 453, bridge output terminal 392, bridge 394, output terminal 393, conductor 454, fixed contact 374, switch arm 366, ground connections 455 and 449 to the input terminal 443.

Electronic motor control means 349 comprises a conventional phase discriminator circuit. Tubes 354 and 355 are shown to comprise triodes which have a common input resistor 460 energized from amplifier 353. Heating current is supplied to tubes 354 and 355 from a common secondary winding 414 of transformer 360. Triode 355 comprises a plate 456, a grid 457, a cathode 458 and a heater filament 459, the latter being connected to winding 414. Cathode 458 is grounded as at 465, and is connected to one terminal of input resistor 460. Grid 457 is connected to the other terminal of resistor 460. Plate 456 is connected to one terminal of secondary winding 416 of transformer 360 by conductor 448; the other terminal of the secondary winding is connected to cathode through one of a plurality of circuits including portions of relay 352 and locking switch 362 and a stator winding of one or the other of motors 356 and 359. Triode 354 comprises a plate 461, a grid 462, a cathode 463, and a heater filament 464, the latter being connected to winding 414. Cathode 463 is grounded as at 465, and is connected to one terminal of input resistor 460. Grid 462 is connected to the other terminal of resistor 460. Plate 461 is connected to one terminal of secondary winding 415 of transformer 360 by conductor 468: the other terminal of the secondary winding is connected to cathode through one of a plurality of circuits including portions of relay 352 and locking switch 362, and one or the other of motors 356 and 357.

Locking switch 362 (in the lower right hand corner of the figure) is shown to comprise a four-pole double-throw switch including switch arms 466, 467, 470, and 471, first fixed contacts 472, 473, 474, and 475, and second fixed contacts 476, 477, 480, and 481 with which the switch arms are normally engaged. The switch is actuated by a handle 482 including an indicator 483 movable between indices 484 and 485. Switch arm 466 is grounded as at 488. Fixed contacts 477 and 481 are not used.

Motor 356 is shown to comprise a pair of field windings 486 and 487 and a squirrel-cage rotor 490. A condenser 491 is in series with field winding 486, and a second condenser 492 is in parallel with field winding 487. Rotor 490 is connected with shaft 439 previously identified.

Motor 359 is shown to comprise a pair of field windings 493 and 494 and a squirrel-cage rotor 495. A condenser 496 is in series with winding 493 and a second condenser 497 is in parallel with winding 494. Rotor 497 is connected to a shaft 542.

Motors 356 and 359 are of a familiar type which operate in a first direction when the two windings are energized with currents in quadrature having a first phase relation, and in the opposite direction when the phase relation of the currents in quadrature is reversed.

Motor 356 and regulating network 351 are comprised in course control unit 11, which also includes an energizing network 505 for a center-zero pilot's direction indicator 508 included in instrument panel 13. Network 505 includes a first potential divided 506 having a winding 507 and a slider 510, and a second potential divider 511 including a winding 512 and a slider 513. The positive terminal of source 361 is connected to windings 507 and 511 by conductors 526 and 527: the other ends of windings 507 and 511 are connected to the negative terminal of source 361 through conductor 509 and ground connection 514. Meter 508 is connected between slider 513 and slider 510 by conductors 517 and 519 so that it indicates the potential difference between the sliders. Slider 513 is connected to shaft 439 for actuation thereby: slider 510 may be manually operated by a manual knob 518.

Shaft 439 is also coupled, through such reducing gear mechanism 516 as may be necessary, to actuate the azimuth function of autopilot 10. The autopilot may be provided with a manually operable knob 517.

It will be appreciated that the maximum values and the resistance gradients of variable resistors 396, 51, 123, 164, 163, and 407 must be chosen with some discretion so that they are in proper accord with one another and give satisfactory ranges of operation. I have found that a range of 0–350 M. P. H. is desirable in $\dot{r}$ resistors 51 and 396; this is provided by 230 ohm resistances traversed in 17½ turns of their shafts. Similarly, a range of 0 to 40 miles, desirable for $\rho$ resistors 123 and 407, is provided by 1320 ohm resistances traversed in 100 turns of their shafts and a range of 0 to 7500 feet, desirable in $T_R$ resistors 163 and 164, is provided by 47 ohm resistors traversed in 3½ turns of their shafts. $T_F$ resistor 535 giving a range of 0–80 seconds may have a resistance of 500 ohms traversed in 40 turns of its shaft. Other combinations of resistances may of course be found satisfactory.

Values for other elements referred to in describing the invention thus far are:

| | | |
|---|---|---|
| Resistor 425 | ohms | 400 |
| Resistor 426 | do | 400 |
| Resistor 428 | do | 1000 |
| Resistor 429 | do | 1000 |
| Resistor 460 | megohms | 5 |
| Potentiometer 506 | ohms | 500 |
| Potentiometer 430 | do | 1100 |
| Potentiometer 431 | do | 500 |
| Potentiometer 511 | do | 600 |
| Capacitor 491 | microfarad | .25 |
| Capacitor 492 | do | .2 |
| Capacitor 496 | do | .25 |
| Capacitor 497 | do | .2 |
| Source 361 | volts D. C. | 28 |
| Source 81 | volts 400 cycles | 115 |

*Operation of navigation system*

Figure 12:
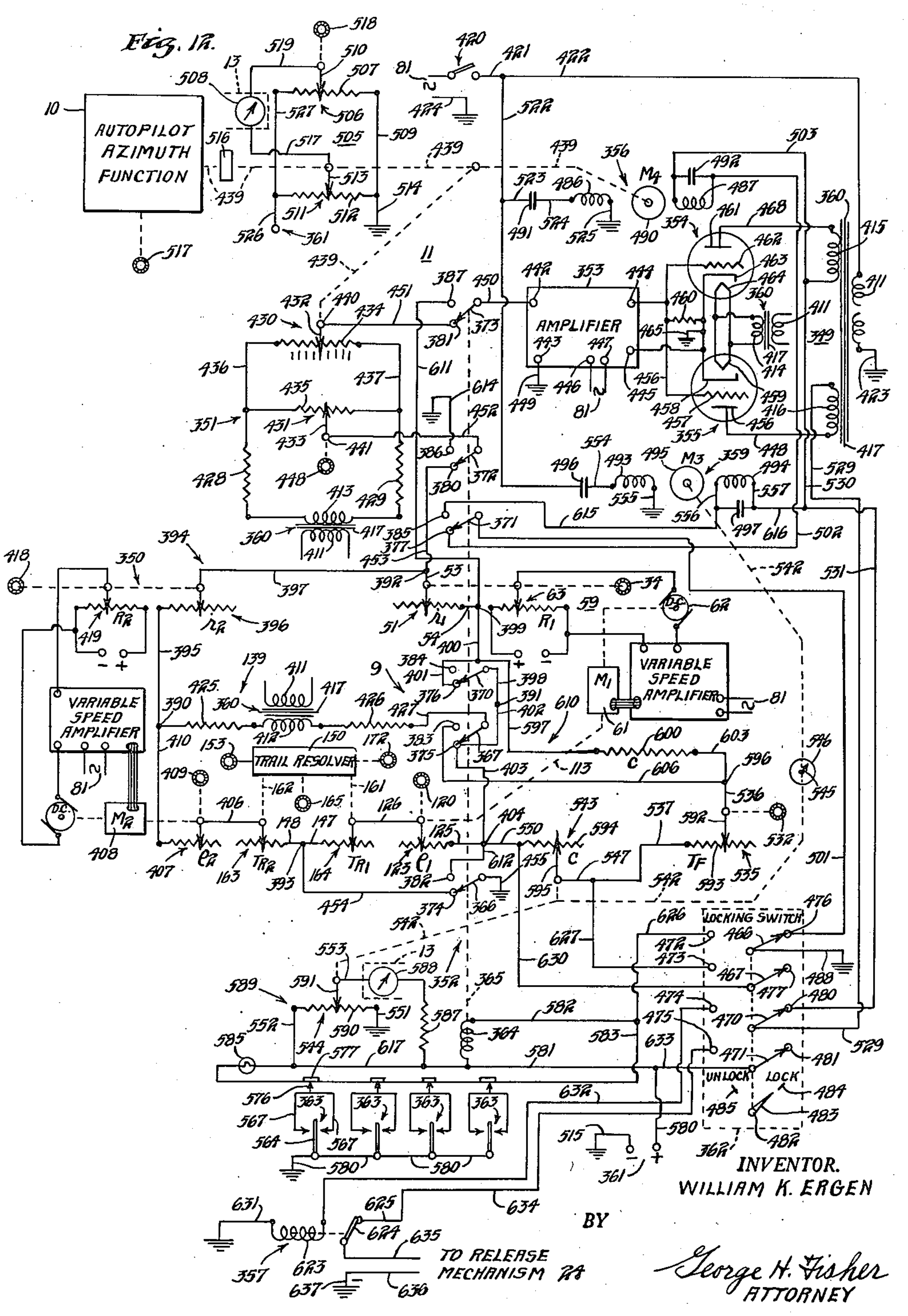
Figure 12 is a detailed wiring diagram of the invention.

The operation of this phase of the invention will now be explained. Referring first to Figures 4 and 12, in the zero condition of the instrument each of rate knobs 34 and 418 is at the limit of its travel in the low rate direction: this sets the $\dot{r}$ resistors and the R potential dividers to zero and stops the rate motors $M_1$ and $M_2$ by reducing the comparison voltages to zero. Each of displacement knobs 120 and 409 is at the limit of its travel: this sets the $\rho$ resistors and counters, and also counter 143, at zero. Each of sliders 432, 433, 510 and 513 is at the center of its traverse. Switch 420 is closed and sources 81 and 361, as well as the constant voltage sources for the R potential dividers, are energized. Knob 153 of the trail resolver 150 is at the end of its travel, counter 151 is at zero, and station angle knob 165 and station bearing knob 172 of the trail resolver are set to zero. The compass system is also energized.

By way of a concrete problem let it be assumed that a craft equipped for practicing the invention is approaching airport P, Figure 1, and the pilot wishes to continue from there to drop a cargo carrier for delivery at $T_x$. Let $l_1$ be 287 miles, $l_2$ be 233 miles, $d_1$ be 288 miles, and $d_2$ be 55 miles. From the map angles $\beta$, $\alpha_1$, and $\alpha_2$ are found to be 43°, N 101° E, and N 58° E, and the sector of approach is determined to be $l$. Suppose the craft is to fly at an altitude of 7000 feet with an airspeed of 175 miles per hour: for the particular cargo carrier to be used let the trail distance for these conditions be 472 feet. The wind is blowing at 30 miles per hour from N 69° W. Under these conditions it may easily be shown that the craft should pass over P with a heading N 39° E. and will follow a ground path N 48° E.

The instrument is set up as follows. Knobs 44 and 99 controlling the reversing gearing 41, 127, 136, and 139 are turned to their "forward" position, for a sector $l$ approach. Station bearing knob 172 is set to N 101° E. Station angle knob 165 is set to 43°. Knob 163 is turned until its graduations, and counter 151, indicate a trail distance of 472 feet. The components of the trail distance along lines $S_1T_x$ and $S_2T_x$ are thereafter continuously compensated for changes in the heading of the craft, by the input to the trail resolver from the compass.

Correlation is also required of the $\rho$ counters, 135 and 520, with the primary and secondary phase shifters and oscilloscope pulse pairs in the distance monitor. It will be recalled that with either phase shifter in its zero position the angular displacement between the pulses of the associated oscilloscope pulse pair is a measure of the round trip distance between the aircraft and one of the base stations, and that if the pulses are brought into alignment by adjustment of the phase shifter, the amount of adjustment required is also a measure of the round trip distance.

As the aircraft moves toward its destination, $d_1$ and $d_2$ become larger. The values of $l_1$ and $l_2$ do not change, so the values of $\rho_1$ and $\rho_2$ become smaller. In other words, operation of the counters must be positive in the opposite direction to that of the components in the distance monitor. Since the counters are to be operated by means which also adjust the phase shifters, it is essential, moreover, that the coupling members 144 and 521 be operated only after a proper relationship between the counters and the position of shafts 33 and 35 has been established. This is done at a time when the phase shifters and counters can both be related to a location whose primary and secondary radio distances are known.

In the illustrative example given above, $l_1$ and $l_2$ are 287 miles and 233 miles. At the point P, the values $d_1$ and $d_2$ are 228 miles and 55 miles: $\rho_1$ and $\rho_2$ are therefore 59 miles and 173 miles. At the destination $T_x$, $d_1$ and $d_2$ are the same as $l_1$, and $l_2$ and $\rho_1$ and $\rho_2$ are zero. Accordingly, while $d_1$ is changing from 228 to 287 miles, $\rho_1$ must change from 59 miles to 0 miles, and while $d_2$ is changing from 55 miles to 233 miles, $\rho_2$ must change from 173 miles to 0 miles.

One method of coordinating the navigating unit and the distance monitor will now be evident. Counter 135 is set to 59 miles, and primary phase shifter shaft 33 is rotated to an angle corresponding to 228 miles: counter 520 is similarly set to 173 miles and secondary phase shifter shaft 35 is rotated through an angle corresponding to 53 miles. Now if the aircraft takes such a position that the primary and secondary oscilloscope pulse pairs are in alignment, it is accurately located at P, and coupling units 144 and 521 can be engaged.

The above method involves bringing the aircraft to a particular location, and hence might at times require that it go out of its way to coordinate the instrument. This can be avoided as follows: The phase shifter shafts are set to the radio distance of any point for which these are known, and the $\rho$ counters are similarly set. Then without waiting for the craft to take any particular position as indicated by the oscilloscope pulse pairs, the coupling units are engaged. Operation of knobs 120 and 409 now adjust the phase shifters and $\rho$ counters simultaneously, and at any time the pulse pairs can be brought into alignment by this means, the counters then indicating the $\rho$ values for whatever spot the craft happenrs to be in, and the amounts of adjustment of the phase shifter shafts giving the distances from that spot to the base stations.

The method of setting up and coordinating the instrument has now been explained. However, the aircraft is in flight, and its movement will with respect to the base stations immediately cause the pulse pairs to start moving out of alignment. Manual operation of knobs 120 and 409 will maintain the pulse pairs in alignment if this is desired, or they may be allowed to diverge and so indicate distance of the aircraft from the point for which the units were coordinated.

Due to the limitations set by the selection of suitable resistance values for components of the Wheatstone bridge to give desired sensitivity, the navigating unit is effective only when the craft is within an area limited by the arcs $R_1$, $R_2$, $R_3$, and $R_4$ in Figure 1. When using the computer here described, $R_1$ has the radius $l_1-40$; $R_2$ has a radius of $l_1$; $R_3$ has a radius of $l_2-40$; and $R_4$ has a radius $l_2$. When the monitor indicates that both the primary and the secondary radio distances are less than 40, the navigation unit is ready to use. In brief review, the system is operated by setting up known distances and angles on the navigating unit, coordinating and then coupling the navigating unit with the distance monitor, and thereafter manually operating the rate and displacement knobs so that the oscilloscope pulse pairs are maintained in alignment. This alignment can be obtained only when the counters on the navigating unit indicate $\rho_1$ and $\rho_2$ for the location of the aircraft, so that when the pulse pairs remain in alignment the rate motors are operating at a speed proportional to the components of the aircraft velocity with respect to the base station. When these conditions are met, and the $\dot{r}$ rates are moreover proportional to the $\rho$ distances, the craft is on the desired course. Whenever the last condition is not fulfilled, a bridge is unbalanced giving a signal to the automatic pilot to return the craft to the proper course, and new knob settings will be required.

Suppose the craft has made good its course along $PT_x$ and reaches a position X' at which the indicated radio distances are both less than 40 miles. If knob 409 (Figures 4 and 12) is now rotated to rotate phase shifter shaft 35 until the secondary oscilloscope pulses are in alignment, the value of $l_2-d_2$ or $\rho_2$, appears on counter 520. Similarly, knob 120 can be rotated to rotate phase shifter shaft 33 until $l_1-d_1$, or $\rho_1$, appears on counter 135 when the primary oscilloscope pulses are in alignment.

It can be foreseen that the pulses will at once begin to depart from coincidence, and knobs 34 and 418 must be rotated to positions where it is estimated that the speeds of motors 61 and 408 are proportional to the speed of the aircraft with respect to stations $S_1$ and $S_2$.

If for the first setting of knobs 120, 409, 34 and 418, the aircraft is moving along a straight line from its present location to its destination, and the estimate of the desired speed of motors 61 and 488 is correct, the bridge is in balance according to the equation $$\dot{r}_1/\dot{r}_2=(\rho_1+T_{R1})/(\rho_2+T_{R2})$$

and no signal is derived from the bridge. This means that no voltage is impressed on the amplifier, and accordingly no amplifier output voltage is impressed between grids 462 and 457 and ground. In the normal condition of relay 352, tubes 354 and 355 therefore discharge equally on alternate half cycles as follows. When plate 461 is positive, plate 456 is negative. Tube 354 alone discharges through a circuit which may be traced from the upper terminal of winding 415 through conductor 468, plate 461, cathode 464, ground connections 465 and 488, switch arm 466 of locking switch 362, fixed contact 476, conductor 501, switch 371 of relay 352, fixed contact 377, conductor 502, winding 487 of motor 356 in parallel with condenser 492, and conductor 503 to the lower terminal of winding 415. During the next half cycle, plate 456 is positive and plate 461 is negative. Tube 355 alone discharges through a circuit which may be traced from the lower terminal of winding 416 through conductor 448, plate 456, cathode 458, ground connections 465 and 488, switch arm 466 of locking switch 362, fixed contact 476, conductor 501, switch arm 371 of relay 352, fixed contact 377, conductor 502, winding 487 of motor 356 in parallel with condenser 492, conductors 503, 530, and 531, fixed contact 480 of locking switch 362, switch arm 470, and conductor 529 to the upper terminal of winding 416. The voltage across winding 487 is of the same instantaneous polarity regardless of which tube discharges, being supplied through a circuit from source 81 through switch 420, conductors 421, 522, and 523, condenser 491, conductor 524, winding 486, and ground connections 525 and 424, while the voltage across winding 486 reverses at each half cycle. Condenser 491 introduces a quadrature component into the relation between the voltages, so that for discharge of tube 354 the motor 356 is urged in a first or forward direction, while for discharge of tube 355 the motor is urged in a second or reverse direction. These opposite impulses follow one another so closely that the motor is unable to respond to them individually, and so takes an average position, which is its central position. Shaft 439 does not rotate, slider 432 is stationary on its winding, slider 513 is stationary on its winding so meter 508 retains its central position, and no mechanical input is transmitted to the autopilot, which is the desired result since the craft is already on its proper course.

It is not likely, however, that the first setting of the knob and the position and heading of the aircraft will at once lead to a balanced bridge, and it is therefore necessary to bring this condition about: this process is known as synchronizing the instrument. If the setting of the knobs is not such as to balance the bridge, a signal appears across the bridge terminals of a first phase or of the opposite phase depending on the sense of the inequality between the $\dot{r}_1/\dot{r}_2$ and $(\rho_1+T_{R1})/(\rho_2+T_{R2})$. If the former is greater, the signal impressed on the amplifier is in phase with the plate voltage on tube 354; if less, the signal is in phase with the plate voltage on tube 355. Increased discharge takes place in the tube whose plate and grid voltages are in phase, and decreased discharge in the other tube. The pulses of opposite energization for motor 356 are no longer equal, and the motor has a resultant rotation in a forward or reverse direction as the discharge of tube 354 exceeds or is less than the discharge of tube 355. Operation of motor 356 in a forward direction results in a mechanical input to the autopilot to cause the aircraft to turn to the left. It also moves slider 513 to the left along winding 512, creating a voltage difference across the terminals of meter 508 which is displaced to indicate the craft is heading too far to the right. At the same time, slider 430 is moved to the left along winding 434, creating a voltage difference between slider 432 and slider 433, which is in series with the bridge output signal and of the opposite phase. Operation of motor 356 continues until the signal derived from regulator circuit 351 is equal and opposite to that from the bridge, when no voltage reaches the amplifier input, and the motor is deenergized. If the bridge is originally unbalanced in the opposite direction, an opposite mechanical input is delivered to the autopilot, an opposite off-course indication appears on the meter, and an opposite rebalancing voltage is supplied from regulated circuit 351.

A change in the course of the aircraft in response to actuation of the autopilot by motor 356 changes the rate at which the oscilloscope indications are changing, thus calling for change in the setting of rate knobs 34 and 418. This adjustment is continued until the oscilloscope indications remain constant, and then the indications are brought back to zero by displacement of knobs 120 and 409. This may again affect the bridge balance, energizing the autopilot to cause a further turn of the aircraft, and the process is repeated until the oscilloscope indications remain zero for a perceptible period, when the craft is moving along a straight line which passes through the desired destination: minor adjustments may be necessary from time to time. It is only when the bridge is balanced at the same time that the oscilloscope indications are motionless at zero, however, that the aircraft is actually following the desired course.

*The computing function*

From the above description it may appear that the process of synchronizing the unit may be a somewhat protracted affair. In the hands of a skilful operator, this is not the case: synchronization may be brought about in as little as three minutes. Nevertheless, it is of advantage for the operator of the instrument to be kept informed of how great an interval remains before the cargo carrier must be discharged, since the craft must be in straight and level flight at that instant. Means for making this information available to the operator are comprised in the invention, and will now be described.

Referring again to Figure 3, and assuming the craft to be at Y and moving along the line $S_2N$ towards N at a speed $\dot{r}_2$, the distance $YT_x$ is $\rho_2$, and the distance $T_xN$ is $T_{R2}$. If the craft is to pass from Y to N in time $t$, then $\dot{r}_2=(\rho_2+T_{R2})/t$ or $\dot{r}_2t=\rho_2+T_{R2}$. By analogy, for a craft located at Z and moving along the line $S_1T_x$, there can be written the equation $$\dot{r}_1t=\rho_1+T_{R1}$$

For any position of the craft a pair of points Y and Z on lines $l_1$ and $l_2$ may be determined, and for these points the two above equations may be added to give $$(\dot{r}_1+\dot{r}_2)t=\rho_1+\rho_2+T_{R1}+T_{R2} \qquad (3)$$

The time $T_f$ required for a cargo carrier of a particular configuration to fall from a given altitude may be accurately determined, and it will be at once apparent that the carrier must be released at exactly that interval before the aircraft passes over the virtual destination. An electric bridge arranged to balance according to the equation $$(\dot{r}_1+\dot{r}_2)T_f=\rho_1+\rho_2+T_{R1}+T_{R2} \qquad (4)$$

will by its unbalance give an indication of the remaining interval before the release point, time being inserted into the bridge by $\dot{r}_1$ and $\dot{r}_2$. Such a bridge is shown in Figure 9, which is a simplified diagram similar to Figure 8 but showing the computing bridge $B_2$ instead of the navigating bridge. It will be seen that this bridge has an input transformer T′, resistors $\dot{r}_1$, $\dot{r}_2$, $T_{R1}$, $T_{R2}$, $\rho_1$, and $\rho_2$ and an amplifier A′. In addition, it includes a fixed resistor $c$, a variable resistor $T_f$, and a rebalancing resistor C which is operated by a motor M under the control of amplifier A′. One input terminal of the bridge is between $\dot{r}_2$ and $T_{R2}$, as before; the other is between $c$ and $T_f$. One output terminal of the bridge is between $\dot{r}_1$ and $c$; the other is between $T_{R1}$ and C. The equation of balance of this bridge is $$(C+T_f)(\dot{r}_1+\dot{r}_2)=c(\rho_1+\rho_2+T_{R1}+T_{R2}) \qquad (5)$$

It will be seen that this equation differs from Equation 4 only in the proportionality constant $c$ and the additional variable C. This variable is driven by motor M to maintain the bridge balanced: its resistance is therefore proportional to the interval remaining before the release point, becoming zero when the craft is at that point. Means connecting components of the navigating bridge for use in this bridge, and further components of this bridge, will now be described.

Figure 6:
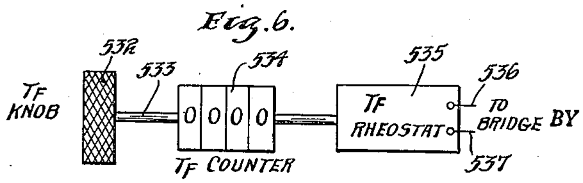

In addition to the controls above described, the invention is provided with a further knob 532 on a shaft 533 best shown in Figure 6 as operating a counter 534 and a rheostat 535 to which connection is made by conductors 536 and 537.

Motor 359 is shown in Figure 7 to actuate a shaft 500 acting through a slip friction 541 on a shaft 542 to which are fixed a rheostat 543, a potential divider 544, and a needle 545 movable with respect to a fixed scale 546. Connection is made to rheostat 543 by conductors 547 and 550, to potential divider 544 by conductors 551, 552, and 553, and to motor 357 by conductors 554, 556 and 557. As shown in the lower central right hand portion of Figure 12, rheostat 535 comprises a slider 592 and a winding 593, and rheostat 543 comprises a winding 594 and a slider 595.

Figure 19:
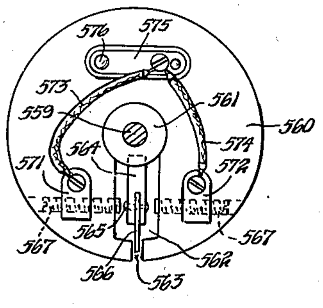
Figure 19 is a detailed view of switching mechanism comprised in the invention.
Figure 17:
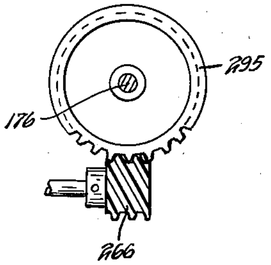

A special construction is required for knobs 34, 170, 409 and 418, and such a knob is shown in Figure 19 to comprise a body 560 of insulating material mounted for free rotating movement without appreciable axial movement on a metallic bushing 561 bored to receive the shaft 559 which the knob is to operate: all of the shafts are grounded and insulated from the sliders which they actuate. A recess 562 is formed in body 560 and has a prolongation in the form of a narrow slot 563. Projecting from bushing 561 is a conducting rod 564 to which is fastened by a rivet 565 a leaf spring 566. Spring 566 has a loose sliding fit in slot 563, but rod 564 has considerable freedom of movement in recess 562. Body 560 is bored with two holes perpendicular to the walls of recess 562, to receive a pair of contact screws 567 traversing a pair of electrically conducting nuts 571 and 572 embedded in body 560. Electrical connection is made by conductors 573 and 574 from nuts 571 and 572 to a brush 575 having a contact 576 which makes continuous connection with a collector ring (shown at 577 in Figure 12) carried by and insulated from the panel in front of which the knob is to be mounted. The mechanism here described comprises a single-pole double-throw switch member 363, and four of these are shown in the lowermost portion of Figure 12.

As long as no torkue is applied to body 560, it is held in a given position with respect to bushing 561 by leaf spring 563, and screws 567 are so adjusted that no electrical contact is made between them and rod 564. However, a slight rotation of the body in either direction is sufficient to overcome the force of the spring and complete the electric circuit; further rotation of the body acts through mechanical contact between the rod and one of the screws to rotate bushing 561 and with it shaft 559, accomplishing the desired mechanical operation. Release of the knob allows the spring to center it with respect to the bushing, regardless of the rotated position of the latter, to again open the electrical circuit.

The function of knob switches 363 is to operate relay 352 whenever any one of the rate and displacement knobs 34, 120, 409 and 418 is rotated in either direction: this function of the switch is accomplished through a circuit which is best shown in Figure 12, and which may be traced from the positive terminal of source 361 through conductors 580 and 581, relay winding 364, conductors 582 and 583, one of collector rings 577, one of contacts 576, one of contact screws 567, one of rods 564, and ground connections 580 and 515. Thus, whenever one of the knobs is rotated, relay 352 is in its actuated position, and the switch arms are out of contact with the set of fixed contacts shown in the figure and in contact with the fixed contacts of the other set. This results in the elements of the navigating bridge being disconnected and in the elements of the computing bridge being connected together, as will be explained presently.

A further addition comprised in the complete system is an indicating system 589 including an illuminating lamp 585, potentiometer 544, a fixed resistor 587, and a meter 588. Potentiometer 544 is shown to comprise a winding 590 and a slider 591. The shaft 542 of motor 359 actuates slider 591 of potentiometer 544 and also slider 595 of rheostat 543.

As mentioned above, the operation of relay 352 breaks down the navigating bridge and sets up the computing bridge using the same and additional components. The input terminals of the computing bridge are shown at 390 and 596, and the output terminals of the computing bridge are shown at 399 and 404. The circuit around the bridge may be traced as follows: input terminal 390, conductor 395, rheostat 396, conductor 397, terminal 392, conductor 53, rheostat 51, conductor 54, output terminal 399, conductors 400 and 597, a fixed resistor 600, conductor 603, input terminal 596, conductor 536, rheostat 535, conductor 537, rheostat 543, conductor 550, output terminal 404, conductor 125, rheostat 123, conductor 126, rheostat 164, conductors 147 and 148, rheostat 163, conductor 406, rheostat 407, and conductor 410 back to terminal 390.

In the operated position of the relay, secondary winding 412 of transformer 360 energizes the bridge, one end of the winding being connected to input terminal 390 through a limiting resistor 425 as before, and the other end of the winding being connected to input terminal 596 through limiting resistor 426, conductor 427, switch arm 367, fixed contact 383, and conductor 606.

*Operation of the computing system*

In Figure 12, the computing bridge has been identified by the reference numeral 610 to distinguish it from navigating bridge 394. In the operative position of relay 352, bridge 610 is connected to amplifier 353 through a circuit which may be traced from input terminal 442 of the amplifier by conductor 450, switch arm 373, fixed contact 387, conductor 611, output terminal 399 of bridge 610, the bridge, output terminal 404, conductor 612, fixed contact 382, switch arm 366, and ground connections 455 and 449.

Operation of relay 352 performs two additional functions. The first of these is to ground tap 433 of regulating network 351 by ground connection 614 through fixed contact 386 and switch arm 372. The second function is to remove control of discriminator 349 from steering motor 356 and to impose it on clock motor 359: this is accomplished by movement of switch arm 371 from fixed contact 377 to fixed contact 385.

The plate circuit of tube 354 in the operated condition of relay 352 may be traced as follows: from the upper terminal of winding 415, conductor 468, plate 461, cathode 463, ground connections 465 and 488, switch arm 466 of locking switch 362, fixed contact 476, conductor 501, switch arm 371 of relay 352, fixed contact 385, conductor 615, winding 494 of motor 359 and condenser 497 in parallel, conductor 616 and conductor 530 back to the lower terminal of winding 415. The plate circuit of tube 355 may be traced from the lower terminal of winding 416 through conductor 448, plate 456, cathode 458, ground connections 465 and 488, switch arm 466 of locking switch 362, fixed contact 476, conductor 501, switch arm 371 of relay 352, fixed contact 385, conductor 615, winding 494 of motor 359 and condenser 497 in parallel, conductors 616 and 531, fixed contact 480 of locking switch 362, switch arm 470, and conductor 529 back to the upper terminal of winding 416.

Shaft 542 of motor 359 and slider 595 of rheostat 543 are connected together so that actuation of slider 595 by operation of clock motor 359 is effective to vary the resistance of the rheostat. Thus, on continued operation of motor 359 in a predetermined direction the resistance in the lower righthand leg of the bridge continues to decrease until it has only the value of $T_f$. If $T_f$ is set at 0, the system operates to indicate the interval before reaching the virtual destination rather than the release point.

The operation of the computing bridge should now be apparent. Whenever one of the knobs having a knob switch is turned, the computing bridge is substituted for the navigating bridge, and motor 359 is energized in a fashion exactly analogous to the energization of motor 356 for the navigating bridge. Motor 367 runs at full speed until by operation of slider 595 the bridge is brought to a temporary condition of balance, and thereafter the motor operates at a speed determined by the rate of operation of rate motors 61 and 408 and their effect on the resistances of resistors 123 and 407. Thus, while the operator is performing a synchronizing function involving the operation of knobs 34, 170, 409, and 418, he has before him on scale 546 a continuous indication of the interval remaining, if the craft maintains its present course, before the release point is reached.

It is assumed the movement of needle 545 along scale 546 is observed by the cargo dispatcher or some other person located near the instrument. It is also considered desirable to provide an indication to the pilot of this same interval, since it may be desired as soon as the release of the cargo is accomplished to change from automatic pilot to manual control of the aircraft and take an entirely new course. The remote indication is accomplished by meter 588 which is mounted on pilot's instrument panel 13, and which is energized by direct current through a circuit which may be traced from the positive terminal of source 361, through conductors 580 and 581 to indicator 589 where it is connected to one terminal of resistor 587 and, by conductors 617 and 552, to one terminal of the winding of potential divider 544. The other terminal of the winding of the potential divider is connected to source 361 through grounded conductors 551 and 515. It will be apparent that when slider 591 is at its extreme left position, the entire voltage drop across winding 590 is impressed across meter 588 and resistor 587 in series, while when wiper 591 is at its extreme right position practically none of the voltage drop across winding 590 is impressed on the meter-resistance series circuit. The reading of the meter is therefore determined at any time by the position of slider 591 along winding 590, and this in turn is determined by operation of shaft 599 of motor 357.

It must be borne in mind that as long as one of the knob switches is in operation, motor 359 operates, so when none of the knob switches are operated energization is transferred from motor 359 to motor 356, and that needles 545 and meter 588 maintain the indication which they had at that time until one of the knob switches is again operated, when the motor 359 will bring the needle and the meter up to date.

It will be realized that by the provision of the computing bridge it is possible for the operator of the instrument to devote himself singly to the problem of synchronizing the course of the craft, since he is at all times kept informed of how much longer interval he has in which to work.

*The release function*

It is perfectly possible for the operator of the instrument to release the cargo carrier at the proper time manually, but means may be provided in the instrument to perform this release function automatically, and more accurately than would be possible by human intervention. This is accomplished only when locking switch 362 is thrown from its "lock" position as shown in Figure 12 to its "unlock" position. Switch 362 is shown to have an operating handle 482 including a pointer 483 traveling between indicia 484 and 485 indicating respectively that the cargo carrier is locked to the aircraft and that it is unlocked and ready to be discharged. The discharge is controlled by a relay 357 comprising a winding 623, a switch arm 624, and a fixed contact 625 with which arm 624 makes connection in the unenergized condition of the relay.

If locking switch 362 is thrown to its "unlocked" position while relay 352 is in its normal position, the relay is at once actuated to its operated position through a circuit which may be traced from the positive terminal of source 361, through conductors 580 and 581, relay winding 364, conductors 582 and 626, fixed contact 472, switch arm 466, and ground connections 488 and 515. Operation of switch arm 466 at the same time interrupts energization of motor 359 as a part of the plate circuit of tube 354. Operation of switch arm 467 entirely removes from the computing bridge the effect of rheostat 543 by short-circuiting it through conductors 627 and 630. Operation of switch arm 470 interrupts the energization of motor 359 from the plate circuit of tube 355, and completes the plate circuit of that tube through winding 623 of relay 357. The circuit for this may be traced from the lower terminal of winding 416 through conductor 448, plate 456, cathode 458, ground connections 465 and 631, winding 623 of relay 357, conductor 632, fixed contact 474, switch arm 470, and conductor 529, back to the upper terminal of winding 416.

Movement of switch arm 471 into contact with fixed contact 475 completes a circuit enabling relay 357 to energize the cargo release mechanism when arm 624 engages contact 625: this circuit may be traced from the positive terminal of sorce 361 through conductors 580 and 633, switch arm 471, fixed contact 475, conductor 634, fixed contact 625 of relay 357, switch arm 624, conductors 635 and 636 to which the release mechanism is connected, and ground connections 637 and 515. From a consideration of this circuit, it will be obvious that the release mechanism cannot be energized until both switch arm 470 and switch arm 471 of locking switch 362 have completed their movements. Switch 362 is so constructed that on operation of manual handle 482, switch arms 466, 467 and 470 make contact with fixed contacts 472, 473, and 474 an appreciable time before switch arm 471 makes contact with fixed contact 475. This provision is made so that electrical energy for operating the release mechanism will not be available to relay 357 until that relay has interrupted the release circuit by leaving its normal position and moving toward its operated position, since it is only upon removal of energization from the winding of the relay that the cargo is to be released.

The cargo release operation is performed as follows: the aircraft is set and maintained in the proper course, until it is a short enough distance from the virtual destination to be within the range of the navigation bridge, by means already described. An attempt is then made to synchronize the instrument, and while the synchronizing knobs are being turned the computing bridge operates to give an indication of the remaining interval. The knobs are released to allow the navigating bridge to affect the course of the craft and the oscilloscope indications are noted. These processes are repeated until lack of movement of the oscilloscope traces indicates that the craft is maintaining the proper course, and then by slightly turning one of the knobs, the clock motor 359 is allowed to run to indicate the approach of the release point. At the same time the oscilloscope indications are observed to be sure that no change is taking place in the course of the craft. When the clock indicates that about five seconds remain, the locking switch is thrown to its unlocked position. Both the steering motor 356 and clock motor 359 are cut off. The C rheostat is short circuited, unbalancing the computing bridge by the resistance remaining on the C resistor. Relay 357 is energized and moves to its operated position and then the circuit it normally closes is also energized. Further operation of the rate motors $M_1$ and $M_2$ rebalances the computing bridge by varying $\rho_1$ and $\rho_2$. When the bridge is balanced its output is zero, relay 357 is released and closes its circuit, releasing the cargo carrier. After the carrier is released, the aircraft is ready to resume its course to the next delivery or pick up point.

From the foregoing, it will be apparent that the invention ambodies means for determining at any time the position of a craft with respect to ground stations, means for directing the craft along a straight line from its present location to pass directly over a predetermined point, within limits of area set by the selection of circuit components, means for indicating the interval remaining before a cargo carrier must be released, and means for accurately releasing the cargo carrier so that it will reach the ground level at a predetermined point.

Numerous objects and advantages of my invention have been set forth in the foregoing description, together with the details of the structure and function of the invention, and the novel features thereof are pointed out in the appended claims. The disclosure, however, is illustrative only, and I may make changes in detail, especially in matters of shape, size and arrangement of parts, within the principle of the invention, to the full extent indicated by the broad general meaning of the terms in which the appended claims are expressed.

I claim as my invention:

1. Means for responding to the rate and magnitude of the rotation of a shaft comprising, in combination: said shaft; means for driving said shaft at a variable rate; manually adjustable means for varying said rate in proportion to the extent of adjustment thereof; variable resistors operated by said shaft and said manual means; and means connecting said resistors to form adjacent arms of an electric bridge.

2. Means for responding to the rate and magnitude of the rotation of a shaft, comprising, in combination: said shaft; means for driving said shaft at a variable rate; manually adjustable means for varying said rate in proportion to the extent of adjustment thereof; variable resistors operated by said shaft and said manual means; a further variable resistor; means operating said further resistor in accordance with the component, in a selected direction, of a vector quantity also having a selected direction; and means connecting all said variable resistors to form adjacent arms of an electric bridge.

3. Means for responding to the rate and magnitude of the rotation of a pair of shafts comprising, in combination: the shafts; means for driving each shaft at a variable rate; manually adjustable means for varying each said rate in proportion to the extent of adjustment thereof; a variable resistor operated by each said shaft and each said manual means; means connecting said resistors in the arms of a single normally energized electric bridge; and a counter connected to both said shafts and driven by operation of either.

4. In apparatus for controlling the movement of an aircraft toward a point of destination, in combination: indicator means having a condition of zero indication; means for actuating said indicator means out of said condition of zero indication to an extent determined by the distances from a moving aircraft to two spaced base stations having known displacements from the point of destination of the moving aircraft; control members operable to return said indicator means to said condition of zero indication, so that the amounts of operation of said control members are measures of said distances; first control means to be adjusted to an extent determined by the differences between said displacements and said distances; second control means to be adjusted to an extent determined by the rates of change of said differences; means for initially adjusting said first control means to an extent determined by said displacements; motor means causing adjustment of said first control means; adjustable motor control means causing operation of said motor means to adjust said control means at variable rates; means releasably coupling said first control means to said control members; means connecting said second control means to adjust said motor control means; a pilot's direction indicator; and means actuating said indicator to an extent and in a sense determined by the adjustments of said control means; the arrangement being such that when said control means are so adjusted that said indicator means are maintained in said condition of zero indication, no operation of said pilot's direction indicator takes place.

5. In apparatus for controlling the movement of an aircraft toward a point of destination, in combination: indicator means having a condition of zero indication; means for actuating said indicator means out of said condition of zero indication to an extent determined by the distances from a moving aircraft to two spaced base stations having known displacements from the point of destination of the moving aircraft; control members operable to return said indicator means to said condition of zero indication, so that the amounts of operation of said control members are measures of said distances; first control means to be adjusted to an extent determined by the differences between said displacements and said distances; second control means to be adjusted to an extent determined by the rates of change of said differences; means for initially adjusting said first control means to an extent determined by said displacements; motor means causing adjustment of said first control means; adjustable motor control means causing operation of said motor means to adjust said control means at variable rates; means releasably coupling said first control means to said control members; means connecting said second control means to adjust said motor control means; apparatus for controlling the direction of movement of the aircraft; and means actuating said apparatus, from a position of no control effect, to an extent and in a direction determined by the adjustments of said control means, the arrangement being such that when said control means are so adjusted that said indicator means are maintained in said condition of zero indication no actuation of said control apparatus takes place.

6. Apparatus for bringing about the release of a body, having a known trail distance and time of fall, at a selected point along a straight line course being followed by an aircraft moving at a constant airspeed and altitude toward a destination whose displacement from each of two base stations of known location is also known, comprising, in combination: means giving first outputs determined by the components, along lines joining the base stations with the point of destination, of the distance from the aircraft to the point of destination; means giving second outputs determined by like components of the trail distance of the body; means giving third outputs determined by the rates of change of said first named distances; means giving a fourth output determined by the time of fall of the body; an indicator of interval before release point; and means connected to said above named means for causing operation of said indicator to an extent determined by said outputs.

7. In apparatus for bringing about the release of a body, having a known trail distance and time of fall, from an aircraft moving at a known speed and altitude, at such a release point and in such an initial direction that it reaches the ground at a predetermined point of destination, in combination: radio responsive means for giving outputs determined by the distances from the aircraft to two spaced points of known location relative to the point of destination, and by the components of instantaneous velocity of the craft along the lines joining said points of destination and said spaced points; means for controlling the direction of movement of the aircraft in accordance with said outputs so as to bring the aircraft onto a straight line course from its instantaneous location to the point of destination; means adjustable to modify the action of said first-named means to a limited extent determined by the magnitude of the trail distance of the body so that the above-named straight line course becomes one passing through a point of release instead of through the point of destination; means for computing from said output the instantaneous distance from the craft to the point of release and for releasing the body when this distance becomes zero; and means selectively supplying said outputs either to said aircraft direction controlling means or to said computing means.

8. Apparatus for bringing about the release of a body, having a known trail distance and time of fall, at a selected point along a straight line course being followed by an aircraft moving at a constant airspeed and altitude toward a destination whose displacement from each of two base stations of known location is also known, comprising, in combination: means giving first outputs determined by the components, along lines joining the base stations with the point of destination, of the distance from the aircraft to the point of destination; means giving second outputs determined by like components of the trail distance of the body; means giving third outputs determined by the rates of change of said first-named distances; means giving a fourth output determined by the time of fall of the body; apparatus for releasing the body from the aircraft; and computing means connected to said above named means for causing operation of said releasing apparatus when the ratio of the sum of said first and second outputs to the sum of said third outputs assumes a unique relation to said fourth output.

9. Apparatus for bringing about the release of a body, having a known trail distance and time of fall, at a selected point along a straight line course being followed by an aircraft moving at a constant airspeed and altitude toward a destination whose displacement from each of two base stations of known location is also known, comprising, in combination: a first pair of impedance devices to be adjusted to values determined by the components, along lines joining the base stations with the point of destination, of the distance from the aircraft to the point of destination; motor means for adjusting said devices at variable rates; means adjustable to vary the rates of operation of said motor means; a second pair of impedance devices adjustable to values determined by the adjustments of said second named means; a balanceable network having impedance arms determining the condition of balance thereof; means connecting said pair of devices in two arms of said balanceable network; apparatus for releasing the body from the aircraft; and means causing operation of said releasing apparatus when said network assumes a condition of balance.

10. Apparatus for bringing about the release of a body, having a known trail distance and time of fall, at a selected point along a straight line course being followed by an aircraft moving at a constant airspeed and altitude toward a destination whose displacement from each of two base stations of known location is also known, comprising, in combination: a first pair of impedance devices to be adjusted to values determined by the components, along lines joining the base stations with the point of destination, of the distance from the aircraft to the point of destination; motor means for adjusting said devices at variable rates; means adjustable to vary the rates of operation of said motor means; a second pair of impedance devices adjustable to values determined by the adjustment of said second named means; a balanceable network including impedance arms determining the condition of balance thereof; means connecting said pair of devices in two arms of said network; a further variable impedance device adjustable to a value determined by the time of fall of the body; means connecting said further device in a further arm of said balanceable network; apparatus for releasing the body from the aircraft; and means causing operation of said releasing apparatus when said network assumes a condition of balance.

11. Apparatus for bringing about the release of a body, having a known trail distance and time of fall, at a selected point along a straight line course being followed by an aircraft moving at a constant airspeed and altitude toward a destination whose displacement from each of two base stations of known location is also known, comprising, in combination: a first pair of impedance devices to be adjusted to values determined by the components, along lines joining the base stations with the point of destination, of the distance from the aircraft to the point of destination; motor means for adjusting said devices at variable rates; means adjustable to vary the rates of operation of said motors; a second pair of impedance devices adjustable to values determined by the adjustments of said second named means; a balanceable network including impedance arms determining the condition of balance thereof; means connecting said pair of devices in two arms of said network; an indicator; a second motor for adjusting said indicator; a further variable impedance device adjusted by said second motor; means connecting said further device in a further arm of said balanceable network; and means energizing said second motor to an extent and in a sense determined by the unbalance of said network.

12. Apparatus for bringing about the release of a body, having a known trail distance and time of fall, at a selected point along a straight line course being followed by an aircraft moving at a constant airspeed and altitude toward a destination whose displacement from each of two base stations of known location is also known, comprising, in combination: a first pair of impedance devices to be adjusted to values determined by the components, along lines joining the base stations with the point of destination, of the distance from the aircraft to the point of destination; motor means for adjusting said devices at variable rates; means adjustable to vary the rates of operation of said motor means; a second pair of impedance devices adjustable to values determined by the adjustments of said second named means; a balanceable network including impedance arms determining the condition of balance thereof; means connecting said pair of devices in two arms of said network; apparatus for releasing the body from the aircraft; means for causing normal operation of said releasing apparatus when said network assumes a condition of balance; an indicator; second motor means for adjusting said indicator; a further variable impedance device adjusted by said motor; means connecting said further device in a further arm of said network; a still further variable impedance device adjustable to a value determined by the time of fall of the body; means connecting said still further impedance device in said further arm of said balanceable network; and control means actuable from a first operated condition, in which said normal operation of said releasing apparatus is disabled and said second motor means is energized to an extent and in a sense dependent upon the unbalance of said network, to a second operated condition, in which said normal operation of said releasing apparatus is restored, said motor is disconnected from the unbalance output of said network, and said still further variable impedance device is short-circuited.

13. In a system for controlling the operation of an aircraft in an area traversed by two intersecting lines having known bearings, in combination: a craft control member; means for energizing said member; and bridge means for controlling said last named means; said bridge means including first and second variable resistors comprising respectively first and second fixed windings and first and second sliders movable therealong; means for moving each said slider about an arbitrary position on its winding in a closed cycle, said cycles being of equal variable amplitude and of variable relative phase; manual means for adjusting the phase of one of said cyclic movements with respect to the other in accordance with the angle between said intersecting lines; manual means for determining the amplitude of said cycle in accordance with the trail distance of a body; a compass repeater subject to movement through a cycle of 360°; manual means for adjusting the phase of both said first named cyclic movements simultaneously, so as to coordinate the phase of one of them with that of said repeater in accordance with the bearing of one of said lines; and means connecting said sliders to said repeater for actuation in synchronism therewith; whereby the resistances of said resistor are caused to vary in proportion to the components, along said lines, of a quantity having the magnitude of said trail distance and the direction of the heading of said aircraft, so as to affect the balance of said bridge.

14. Apparatus for bringing about the release, from an aircraft moving at known speed and altitude, of a body having a known trail distance and time of fall for said speed and altitude, in such a direction and at such a location that it reaches the ground at a predetermined destination, comprising, in combination: said craft; signal emitting means carried by said craft; a pair of base stations fixed with respect to said destination so that the lengths and bearings of the lines joining said stations with said destination are known; signal relaying apparatus at each of said base stations; relayed signal receiving means carried by said craft, including means indicating the interval between emission of a signal and reception of the relayed signal from each base station, and hence the distances between said craft and said base stations; control members operative to cause the indications of said indicator means to return to zero, the extent of operation of said members being proportional to said distances; first control means, including manually operable setting means, calibrated in terms of differences between said lengths and said distances; means releasably coupling said control means to said control members; first impedance means actuated by said manually operable setting means; motor means for causing operation of said first control means at variable rates; means for varying the speed of said motor means; second impedance means actuated by said last named means; third impedance means; means varying said third impedance means in accordance with the bearings of said lines, the heading of said craft, and the magnitude of said trail distance; fourth impedance means manually variable in accordance to said time of fall; switching means having a plurality of operative positions; means operative in a first position of said switching means to connect said first, second and third impedance means in arms of a first normally energized bridge means; means changing the heading of said craft upon unbalance of said first bridge; fifth impedance means; a motor for varying said fifth impedance means; means operative in a second position of said switching means to connect all said impedance means in arms of a second normally energized bridge; means energizing said last named motor upon unbalance of said second bridge to bring about rebalance thereof; an indicator actuated by said last named motor; means for releasing said body; means responsive to balance of said second bridge to actuate said releasing means; and means for short circuiting said fifth impedance means and energizing said actuating means.

15. In an apparatus for directing a craft toward a predetermined destination, in combination: means for controlling the direction of movement of said craft; indicator means having a condition of zero indication; means for actuating said indicator out of said condition of zero indication to an extent determined by the distances between said craft and two spaced base stations having known displacements from said destination; control members operable to return said indicator means to said condition of zero indication, so that the amounts of operation of said control members are measures of said distances; first control means to be adjusted to an extent determined by the differences between said displacements and said distances; means, including a motor, for causing operation of said first control means at a variable rate; manual means for independently operating said first variable impedance means; means for varying the rate of operation of said motor; second variable impedance means actuated concurrently with operation of said last named means; means for coupling said first variable impedance means to said control member for operation unitarily therewith; a normally energized bridge including impedance arms whose impedances determine the condition of balance of the bridge means connecting said variable impedance means in arms of said bridge; and means for actuating said first named means to an extent determined by the unbalance of said bridge.

16. In an apparatus for directing a craft toward a predetermined destination, in combination: means for controlling the direction of movement of said craft; indicator means having a condition of zero indication; means for actuating said indicator means out of said condition of zero indication to an extent determined by the distances between said craft and two spaced base stations having known displacements from said destination; control members operable to return said indicator means to said condition of zero indication, so that the amounts of operation of said control members are measures of said distances; first variable impedance means to be adjusted to an extent determined by the differences between said displacements and said distances; adjustable means for causing operation of said first variable impedance means; means for adjusting the rates of operation of said adjustable means; second impedance means actuated by said adjusting means; means connecting said first variable impedance means in driving relation to said control member; a normally energized bridge including impedance arms whose impedances determine the state of balance of said bridge; means connecting said variable impedance means in arms of said bridge; and means controlling the movement of the craft to an extent determined by the output from said bridge.

17. In apparatus of the class described, in combination: at least four variable impedance members; means varying the impedances of said members in accordance with a plurality of variable quantities; switch means having first and second operative positions; means, including said switch in its first position, for connecting said members to make up the four arms of a first balanceable bridge network whose output has a first relation to the impedances of said members; at least two further impedance members; and means, including said switch in its second position, for interconnecting said impedance members so that said variable impedance members make up two arms only of a second balanceable bridge network whose output has a second relation to the impedances of said members.

18. In apparatus of the class described, in combination: at least four variable impedance members; means varying the impedances of said members in accordance with a plurality of variable quantities $x_1$, $x_2$, $y_1$, and $y_2$; switch means having first and second operative positions; means, including said switch in its first position, for connecting said members to make up the four arms of a first balanceable network whose balance equation is of the form $x_1/x_2=y_1/y_2$; at least two further impedance members means, including said switch in its second position, for interconnecting said impedance members so that said variable impedance members make up two arms only of a second balanceable network whose balance equation is of the form $(x_1+x_2)/(y_1+y_2)=z$ where $z$ is determined by the value of said further impedance members; first and second controlled devices; and a means actuated by said switch means in its first position for energizing one of said devices from the output of said first network, and in its second position for energizing the other of said devices from the output of said second network.

19. In apparatus for supervising the movement of a craft so that it follows a rectilinear course passing through a predetermined destination, in combination: means continuously supplying outputs each proportional to the distance between the craft and one of two spaced reference stations having known positions relative to the destination; balanceable signal means effective when oppositely unbalanced to give signals of opposite senses, and including a plurality of variable impedance members; manually operable means to nullify the outputs of said first named means and simultaneously to adjust a pair of said members to affect the balance of said signal means; and heading supervising means actuated in accordance with any unbalance of said signal means.

20. In apparatus of the class described, in combination: a plurality of variable impedance members; means adjusting a first pair of said members in accordance with the magnitude and rate of change respectively of a first variable quantity; means adjusting a second pair of said members in accordance with the magnitude and rate of change respectively of a second variable quantity; a balanceable network; means connecting said members to comprise portions of said balanceable network; a controlled device; and means actuating said device to an extent determined by the amount of unbalance of said network.

21. In apparatus for supervising the operation of a craft carrying a distance measuring device capable of measuring the distances between its own position and remote points of known position, upon adjustment of control members of said device, in combination: motor means and first manual means for adjusting the control members of the distance measuring device; second manual means for adjusting the speed of said motor means; a plurality of variable impedance members; means varying the impedances thereof upon adjustment of said control members and said second manual means; a balanceable network; means connecting said impedance members to comprise portions of said balanceable network; means for supervising the heading of the craft; and means actuating said supervising means to an extent determined by the unbalance of said network.

22. Apparatus of the class described, comprising, in combination: a distance measuring device capable of measuring the distances between its own position and remote points of known position, upon adjustment of control members of said device; motor means and first manual means connected to said device for adjusting said control members; second manual means connected to said motor means for adjusting the speed of operation of said motor means; control means having variable electrical characteristics; means connected to said control means, said control members, and said manual means, for varying the characteristics of said control means upon adjustment of said control members and said second manual means; means for supervising the operation of a craft carrying said device; and means connected to said control means and said last named means for actuating said last named means in accordance with the relation between the adjusted values of said characteristics.

WILLIAM K. ERGEN.

References Cited in the file of this patent

UNITED STATES PATENTS

| Number | Name | Date |
|---|---|---|
| 1,315,539 | Carson | Sept. 9, 1919 |
| 1,747,664 | Droitcour | Feb. 18, 1930 |
| 2,115,834 | Young | May 3, 1938 |
| 2,137,847 | Libman | Nov. 22, 1938 |
| 2,165,800 | Koch | July 11, 1939 |
| 2,315,754 | Warner | Apr. 6, 1943 |
| 2,315,755 | Warner | Apr. 6, 1943 |
| 2,362,977 | Crosthwait | Nov. 21, 1944 |
| 2,396,112 | Morgan | Mar. 5, 1946 |
| 2,399,726 | Doyle et al. | May 7, 1946 |
| 2,407,325 | Parkinson | Sept. 10, 1946 |
| 2,408,699 | Sparrow | Oct. 1, 1946 |
| 2,412,632 | Sanders et al. | Dec. 17, 1946 |
| 2,415,170 | Hill et al. | Feb. 4, 1947 |
| 2,416,223 | Sanders | Feb. 18, 1947 |
| 2,419,525 | Alford | Apr. 29, 1947 |
| 2,419,970 | Roe | May 6, 1947 |
| 2,420,016 | Sanders | May 6, 1947 |
| 2,423,228 | Conklin | July 1, 1947 |
| 2,431,790 | Crosthwait | Dec. 2, 1947 |
| 2,438,112 | Darlington | Mar. 23, 1948 |
| 2,441,657 | Blitz | May 18, 1948 |
| 2,444,678 | Sanders | July 6, 1948 |
| 2,444,771 | Fyler | July 6, 1948 |
| 2,450,907 | Newton | Oct. 12, 1948 |
| 2,472,129 | Streeter | June 7, 1949 |
| 2,480,208 | Alvarez | Aug. 30, 1949 |
| 2,492,355 | Campbell | Dec. 27, 1949 |
| 2,493,097 | Wolff | Jan. 3, 1950 |
| 2,508,565 | Chance | May 23, 1950 |
| 2,510,707 | Markusen | June 6, 1950 |
| 2,538,226 | Anderson | Jan. 16, 1951 |
| 2,540,916 | Sparrow | Feb. 6, 1951 |
| 2,555,101 | Alvarez | May 29, 1951 |
| 2,558,425 | Droz | June 26, 1951 |